(12) United States Patent
Kunz et al.

(10) Patent No.: US 10,178,542 B2
(45) Date of Patent: Jan. 8, 2019

(54) COMMUNICATION SYSTEM

(71) Applicants: Andreas Kunz, Heidelberg (DE); Genadi Velev, Heidelberg (DE); Iskren Ianev, Heidelberg (DE)

(72) Inventors: Andreas Kunz, Ladenburg (DE); Genadi Velev, Darmstadt (DE); Iskren Ianev, Reading (GB)

(73) Assignee: NEC Corporation, Tokyo (JP)

( * ) Notice: Subject to any disclaimer, the term of this patent is extended or adjusted under 35 U.S.C. 154(b) by 4 days.

(21) Appl. No.: 15/562,721

(22) PCT Filed: Mar. 31, 2016

(86) PCT No.: PCT/EP2016/057170
§ 371 (c)(1),
(2) Date: Sep. 28, 2017

(87) PCT Pub. No.: WO2016/156549
PCT Pub. Date: Oct. 6, 2016

(65) Prior Publication Data
US 2018/0084402 A1 Mar. 22, 2018

(30) Foreign Application Priority Data
Mar. 31, 2015 (EP) .................... 15162091

(51) Int. Cl.
*H04W 8/04* (2009.01)
*H04L 29/08* (2006.01)
(Continued)

(52) U.S. Cl.
CPC .......... *H04W 8/04* (2013.01); *H04L 61/1588* (2013.01); *H04L 67/16* (2013.01); *H04L 67/20* (2013.01);
(Continued)

(58) Field of Classification Search
CPC .......... H04W 8/04; H04W 4/005; H04L 67/20
See application file for complete search history.

(56) References Cited

U.S. PATENT DOCUMENTS 6,873,698 B1 3/2005 Pearson et al.

FOREIGN PATENT DOCUMENTS

EP 1 095 523 A1 5/2001

OTHER PUBLICATIONS

3GPP Standar; 3GPP TR 23.708, 3rd Generation Partnership Project (3GPP), Mobile Competence Centre; 650 Route Des Lucioles; F-06921 Sophia-Antipolis Cedex; France, vol. SA WG2, No. V1.1.0, Feb. 13, 2015, pp. 1-27, XP050927606.*
(Continued)

*Primary Examiner* — Myron K Wyche
(74) *Attorney, Agent, or Firm* — Wilmer Cutler Pickering Hale and Dorr LLP

(57) ABSTRACT

A communication system is disclosed in which a home subscriber server, 'HSS', of a communication network, receives, from a service capability exposure function, 'SCEF', at least one communication pattern parameter set together with an associated validity time, stores the at least one communication pattern parameter set, and when the validity time for a communication pattern parameter set stored in the HSS expires, autonomously deletes the associated communication pattern parameter set.

14 Claims, 18 Drawing Sheets

(51) Int. Cl.
*H04L 29/12* (2006.01)
*H04W 8/18* (2009.01)
*H04L 29/06* (2006.01)
*H04W 88/14* (2009.01)

(52) U.S. Cl.
CPC .............. *H04L 67/30* (2013.01); *H04L 67/34* (2013.01); *H04L 69/28* (2013.01); *H04W 8/18* (2013.01); *H04W 88/14* (2013.01)

(56) References Cited

OTHER PUBLICATIONS

Nokia Corporation et al: "Validity time for ETWS Message Identifier and Serial Number", 3GPP Draft; R2-090535_ETWS_PARAM_VALIDITY_TIME, 3rd Generation Partnership Project (3GPP), 650 Route Des Lucioles; F-06921 Sophia-Antipolis Cedex; France, No. Ljubljana; Jan. 5, 2009, Jan. 5, 2009, XP050322453.*

International Search Report corresponding to PCT/EP2016/057170, dated Jun. 30, 2016 (4 pages).

Written Opinion corresponding to PCT/EP2016/057170, dated Jun. 30, 2016 (10 pages).

Nokia Corporation, et al. "Validity time for ETWS Message Identifier and Serial Number," 3GPP TSG-RAN WG2 Meeting #64bis, R2-090535, Ljubljana, Slovenia, Jan. 12-16, 2009, (2 pages).

3GPP TR 23.708 V1.1.0, 3rd Generation Partnership Project; Technical Specification Group Services and System Aspects; Architecture Enhancements for Service Capability Exposure (Release 13), Feb. 2015, pp. 1-27.

3GPP TS 23.401 V13.2.0, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015, pp. 1-313.

* cited by examiner

COMMUNICATION SYSTEM

This application is a national stage application of International Application No. PCT/EP2016/057170 entitled, "COMMUNICATION SYSTEM FOR RECEIVING A COMMUNICATION PARAMETER SET," filed on Mar. 31, 2016, which claims the benefit of the priority of European Patent Application No. 15162091.1, file on Mar. 31, 2015, the disclosures of each of which are hereby incorporated by reference in their entirety.

The present invention relates to mobile communication devices and networks, particularly but not exclusively those operating according to the 3rd Generation Partnership Project (3GPP) standards or equivalents or derivatives thereof, such as the Long Term Evolution (LTE) of the Evolved Packet Core (EPC) network. The invention has particular although not exclusive relevance to architecture enhancements for a service capability exposure framework in which 3GPP system provided service capabilities are exposed to 3rd party service providers, for example via one or more standardized application program interfaces (APIs).

In a mobile (cellular) communications network, (user) communication devices (also known as user equipment (UE), for example mobile telephones) communicate data packets with remote servers or with other communication devices via base stations. Each base station is connected to a core network (such as an EPC network), which is in turn connected to other networks for providing end-to-end connectivity for the users.

As part of the activities of the 3GPP a study has been going on related to how, from the 3GPP network point of view, to expose 3GPP system provided service capabilities to 3rd party service providers. This study has been performed in the 3GPP Release 13 under the study item Architecture Enhancements for Service Exposure (AESE) in TR 23.708 v1.1.0.

FIG. 1 illustrates schematically, at a high level, the principle of the service capability exposure concept for a 3GPP system 101. As seen in FIG. 1, a 3rd party service provider 102 provides, to the 3GPP system 101 Service Information 104 relating to a particular hosted service for a specific User Equipment (UE) 103 or group of UEs 103-1 to 103-3. This Service Information 104 is sent to a Service Capability Exposure Function (SCEF) 111, which terminates an Application Programming Interface (API) towards the 3rd party service provider 102. The SCEF 111 distributes this Service Information 104 inside the 3GPP System 101 in order to trigger service specific optimizations of the network.

An example of such an optimization was documented in clause 6.5 of TR 23.708 v1.1.0 ("Solution 5: 3GPP resource optimizations based on predictable communication patterns of a UE or a group of UEs") and was shown in FIG. 6.5.1.3-1 ("Signalling sequence for provisioning of Optimized Network Parameters"). For convenience, this example is also illustrated in FIG. 2 of this application. The example concerns how to provision, a node such as a mobility management entity (MME), with communication parameters for a Communication Pattern (CP) of a single application of one UE.

In FIG. 2, an Application Server (AS)/Service Capability Server (SCS) 213 provides, at S220, details of a communication pattern (CP) of a UE (or a group of UEs communicating with the AS 213) to an SCEF 211 using a NOTIFY message. The SCEF 211 sends, at S222, a profile query to a Home Subscriber Server (HSS) 209 to obtain a UE profile for the UE (or group of UEs) and security related information. When the SCEF 211 receives, at S224, a profile answer with the requested information, the SCEF 211 acknowledges the CP message, at S226, with a NOTIFY Response message. The SCEF 211 derives, at S228, the network parameters from the CP and then provisions the relevant network parameters to the relevant nodes at S230.

In one example, the communication pattern from the 3rd party service provider is applied to the derivation of network parameters in the SCEF which are used for a 3GPP feature known as 'CN assisted eNB parameters tuning'. In pursuance of 'CN assisted eNB parameters tuning' the core network, and specifically the MME, derives parameters relating to possible UE behaviour and these parameters are provided to a radio access network (RAN) node (e.g. eNB) to assist the RAN node when configuring a radio link with the UE to do so in a 'proper' manner in which transitions between IDLE and CONNECTED (known as ACTIVE) states are minimized.

In the example of CN assisted eNB parameters tuning, the SCEF selects from the appropriate network parameters derived (or determined or mapped) from the CP based on operator policy. The SCEF provides the selected parameters to the corresponding MME(s), e.g. directly from SCEF to MME or via a home subscriber server (HSS)/home location register (HLR). The MME can then use the CP for deriving the CN assisted eNB parameters.

However, the above examples are relatively limited and do not provide for the efficient provisioning in a number of scenarios. For example, the above examples do not provide for situations in which there is a requirement for more than one application to be supported for a single UE. In such scenarios the above way of provisioning service information may not work at all, for example due to overlapping traffic for the different applications. Moreover, there are potential issues in terms of scalability with the need to store communication parameters on a per application basis in the Home Subscriber Server (HSS), since there is no real limit of the number of applications that can be used in parallel or sequence.

Moreover, the above examples do not address how network communication parameters can be updated efficiently within the 3GPP system, when the $3^{rd}$ party service provider provides details of a new or updated CP, especially given that the CP may be sent at any time.

Accordingly, preferred embodiments of the present invention aim to provide methods and apparatus which overcome or at least partially alleviate the above issues.

In one aspect of the invention there is provided a home subscriber server, 'HSS', for a communication network, the HSS comprising: a receiver configured to receive, from a service capability exposure function, 'SCEF', at least one communication pattern parameter set together with an associated validity time; and a controller configured: to store the at least one communication pattern parameter set; and when the validity time for a communication pattern parameter set stored in the HSS expires, to autonomously delete the associated communication pattern parameter set.

In one aspect of the invention there is provided a mobility management entity, 'MME' for a communication network, the MME comprising: a receiver configured to receive, from home subscriber server, 'HSS', at least one set of parameters associated with a communication pattern together with an associated validity time; and a controller configured to: store the received parameter set for the associated communication pattern; and when the validity time for the parameter set stored in the MME expires, to autonomously delete that parameter set.

In one aspect of the invention there is provided a service capability exposure function, 'SCEF', for a communication network, the SCEF comprising: a receiver configured to receive, from a service capability server/application server, 'SCS/AS', at least one CP parameter set together with an associated validity time; and a transmitter configured to transmit to a home subscriber server, 'HSS', the at least one CP parameter and associated validity time.

In one aspect of the invention there is provided a service capability server/application server, 'SCS/AS', for a communication network, the SCS/AS comprising: a controller configured to control the SCS/AS to: provide, to a service capability exposure function, 'SCEF', at least one CP parameter set together with an associated validity time.

In one aspect of the invention there is provided a communication system comprising at least one home subscriber server as set out above, at least one mobility management entity as set out above, and at least one service capability exposure function as set out above.

In one aspect of the invention there is provided a method performed by a home subscriber server, 'HSS', of a communication network, the method comprising: receiving, from a service capability exposure function, 'SCEF', at least one communication pattern parameter set together with an associated validity time; storing the at least one communication pattern parameter set; and when the validity time for a communication pattern parameter set stored in the HSS expires, autonomously deleting the associated communication pattern parameter set.

In one aspect of the invention there is provided a method performed by a mobility management entity, 'MME' of a communication network, the method comprising: receiving, from home subscriber server, 'HSS', at least one set of parameters associated with a communication pattern together with an associated validity time; storing the received parameter set for the associated communication pattern; and when the validity time for the parameter set stored in the MME expires, autonomously deleting that parameter set.

In one aspect of the invention there is provided a method performed by a service capability exposure function, 'SCEF', of a communication network, the method comprising: receiving, from an service capability server/application server, 'SCS/AS', at least one CP parameter set together with an associated validity time; and transmitting to a home subscriber server, 'HSS', the at least one CP parameter and associated validity time.

In one aspect of the invention there is provided a method performed by a service capability server/application server, 'SCS/AS', of a communication network, the method comprising: providing, to a service capability exposure function, 'SCEF', at least one CP parameter set together with an associated validity time.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

It will be appreciated that whilst, the examples described herein involve a serving node in the form of an 'MME', the serving node may be a different control plane functional entity in the 3GPP core network which terminate control plane signalling between the core network and the terminal. Such serving nodes may, for example be a Serving GPRS Support Node (SGSN), or a mobile switching centre (MSC), and references to MME or serving node should be understood accordingly.

It will further be appreciated that whilst, the examples described herein have been described with reference to an application server (AS), the examples may involve a service capability server (SCS) or the like, and references to AS should be understood accordingly as potentially involving and SCS.

Exemplary embodiments of the invention will now be described, by way of example, with reference to the accompanying drawings in which.

Figure 1:
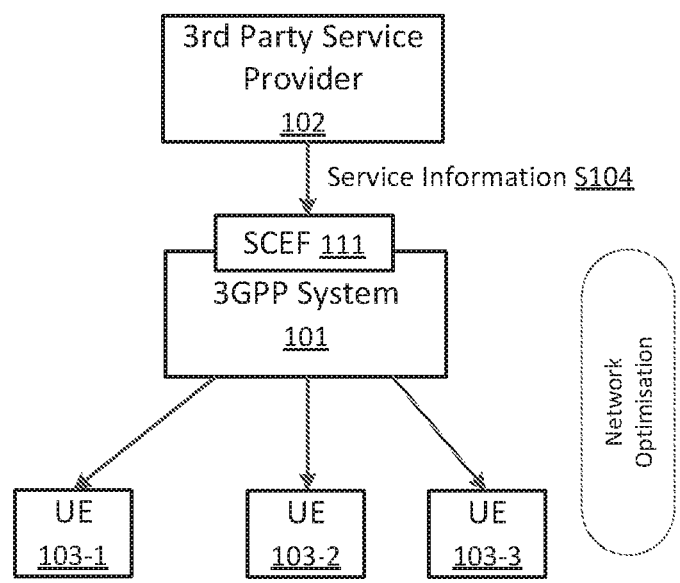
FIG. 1 is a simplified block schematic illustrating the principle of service capability exposure in a 3GPP system.
Figure 2:
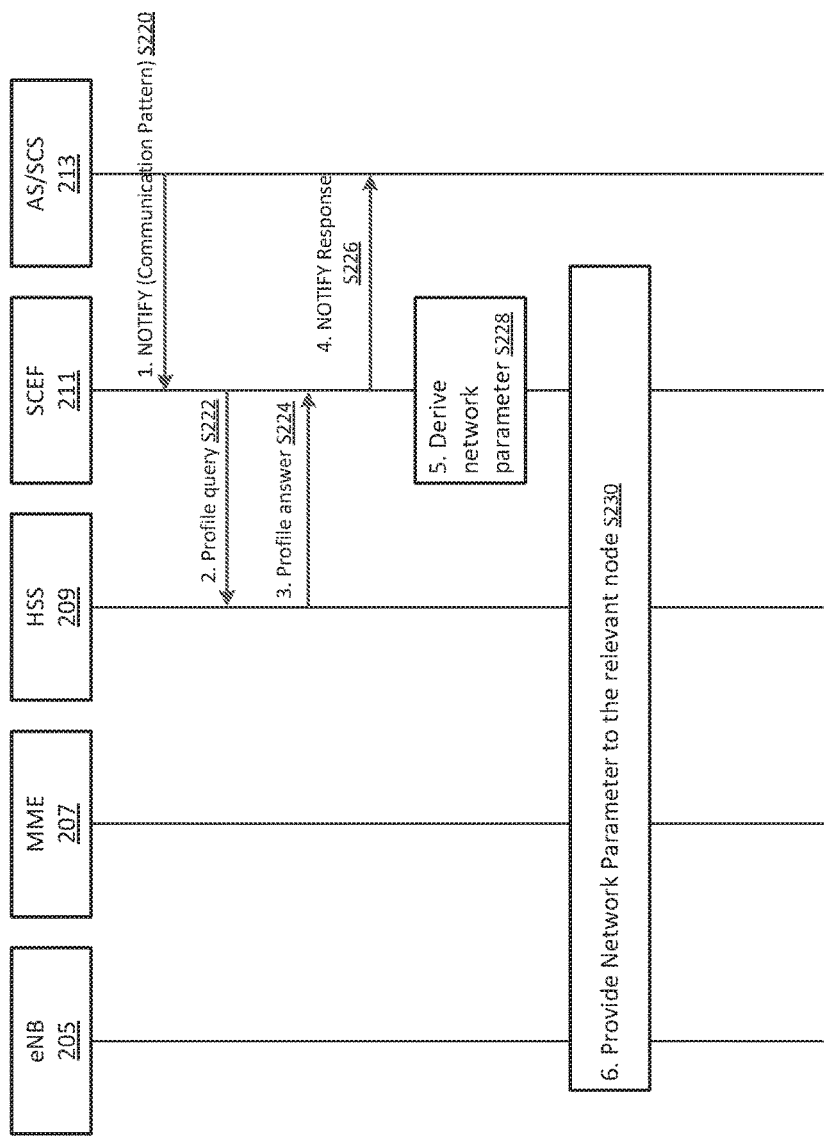
FIG. 2 is a simplified message sequence diagram illustrating a communication pattern provisioning procedure from TR 23.708 v1.1.0.
Figure 3:
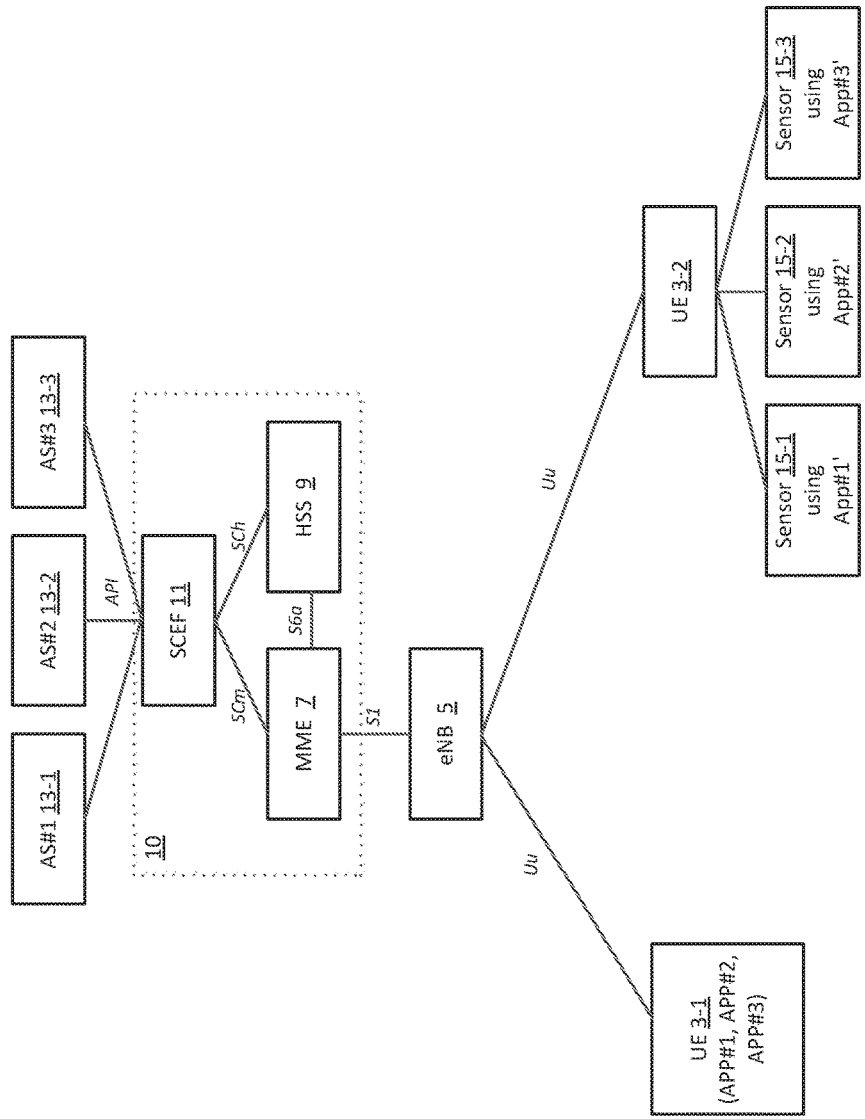
FIG. 3 is a simplified block schematic illustrating a mobile (cellular) telecommunication system of a type to which embodiments of the invention are applicable.
Figure 15:
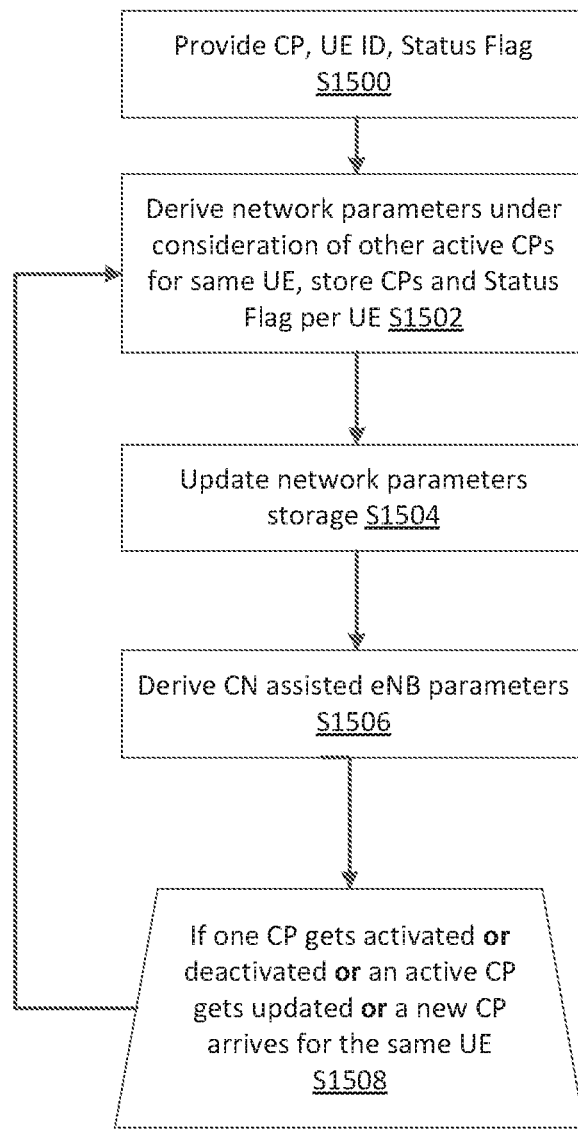
Figure 16:
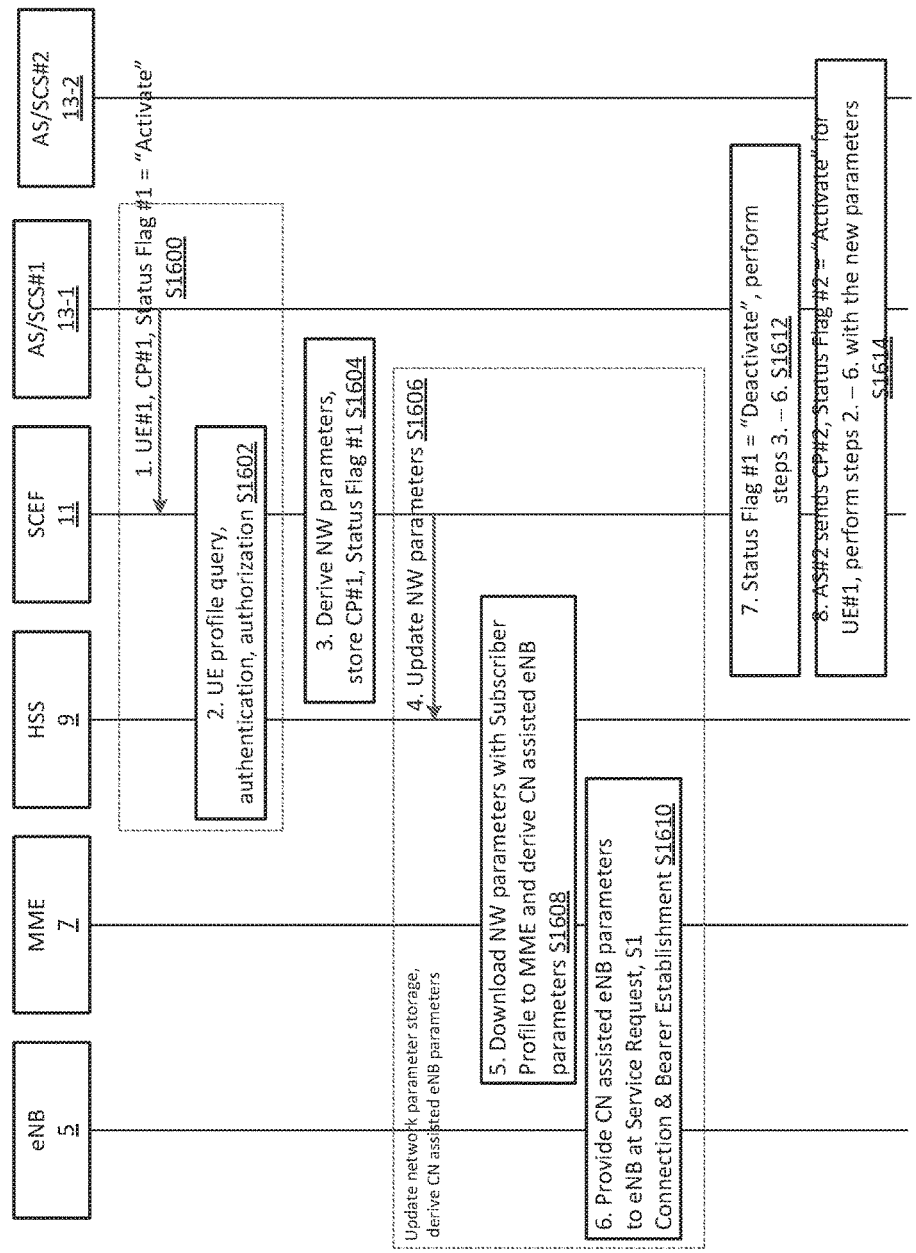
Figure 17:
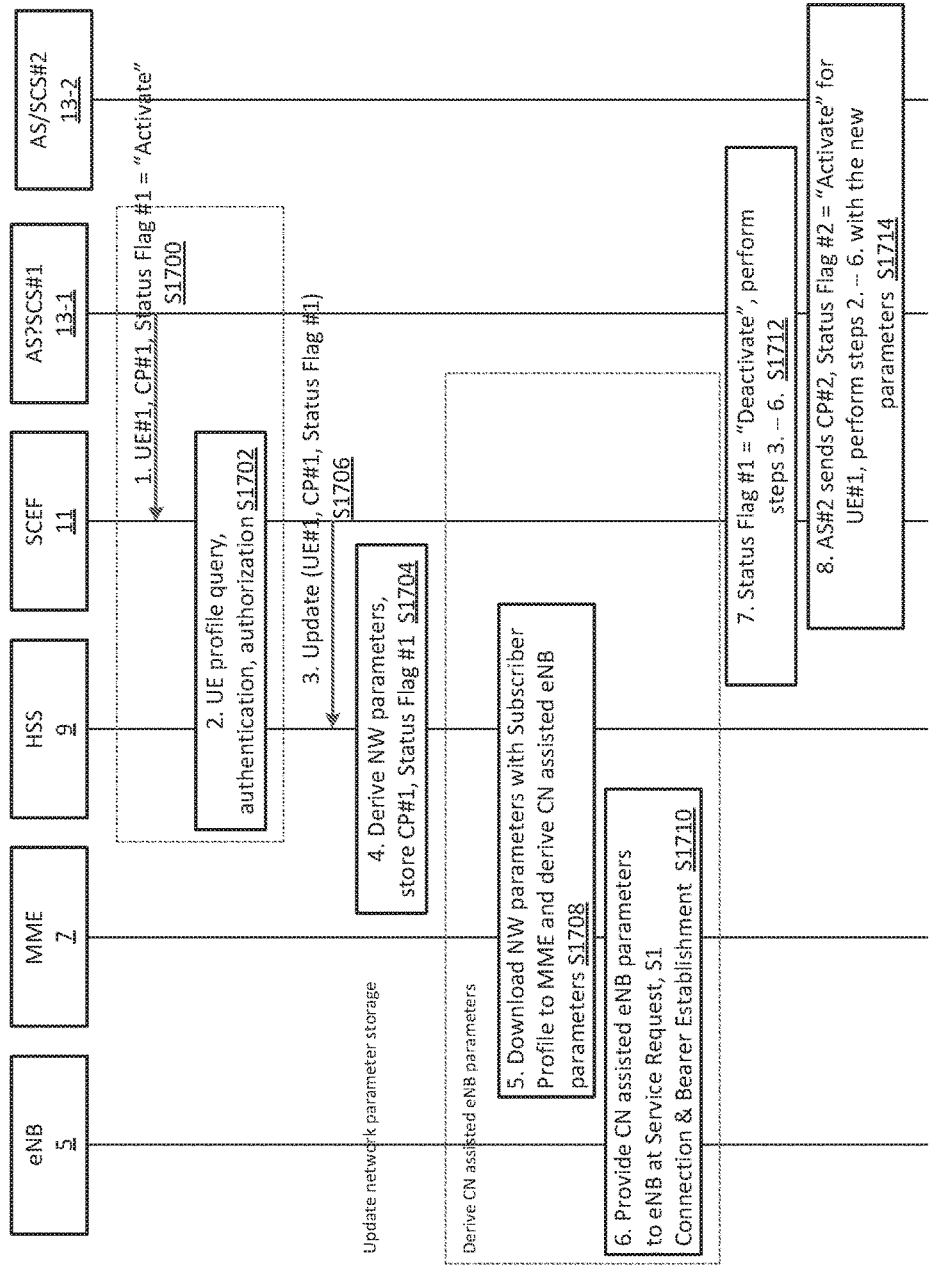
Figure 18:
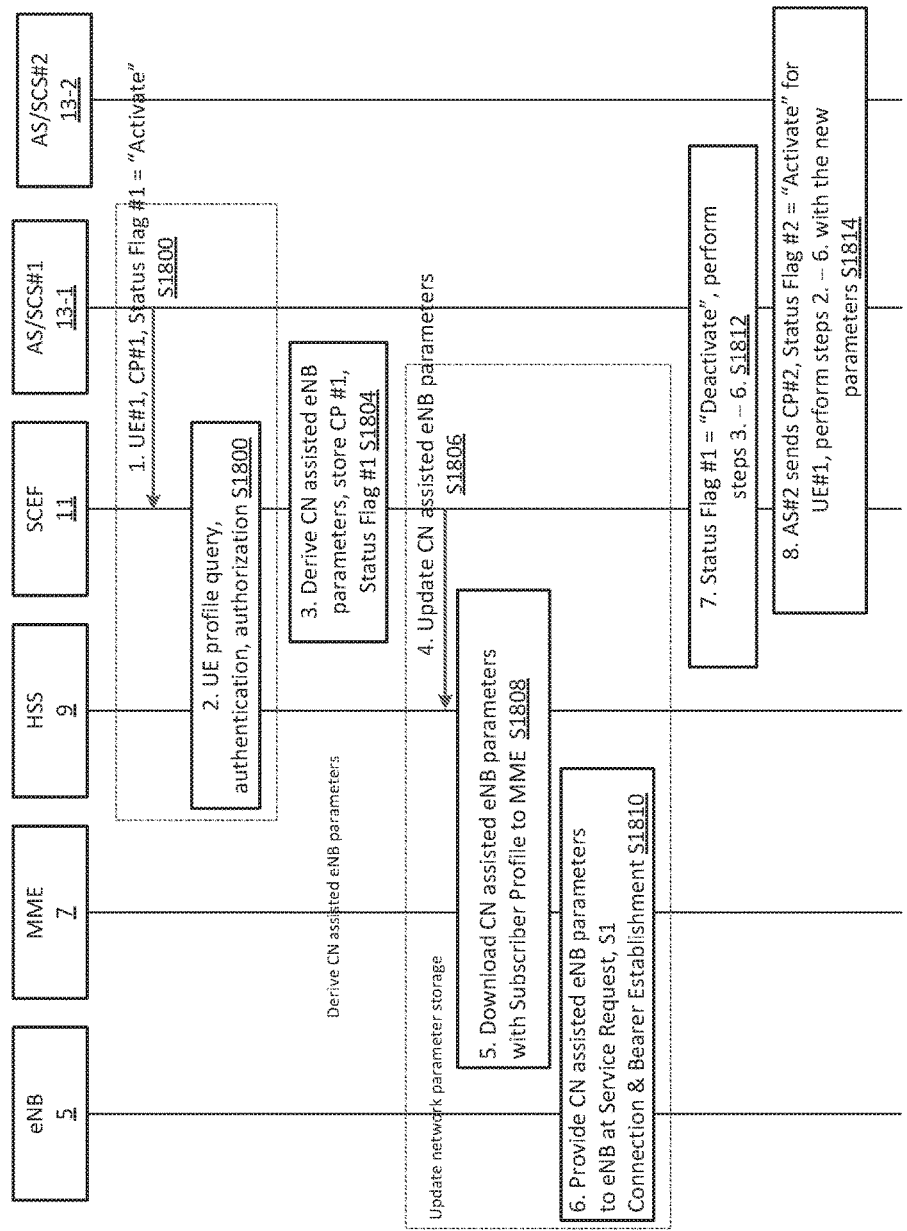

FIG. 15 is a flow chart illustrating, in simplified overview, a node independent call flow of the functionality that is typically executed in pursuance of the provision and use of a communication pattern (CP) with associated status information; and FIGS. 16 to 18 are exemplary message sequence diagrams illustrating methods performed by components of the mobile telecommunication system of FIG. 3 whilst carrying out the exemplary flow of FIG. 15.

OVERVIEW

FIG. 3 schematically illustrates a mobile (cellular) telecommunication system 1 in which users of items of user equipment (UEs) 3-1, 3-2, such as mobile devices, machine type communication devices and/or the like, can communicate via a base station 5 (which, in this example, is an E-UTRAN base station/evolved NodeB/eNB) and a core network 10 using an appropriate radio access technology (RAT), (e.g. E-UTRA and/or the like). As those skilled in the art will appreciate, whilst a configuration having a single base station 5, two mobile devices 3-1, 3-2 and a number of other communication nodes are shown in FIG. 3 for illustration purposes, the system, when implemented, will typically include other mobile devices, base stations and communication nodes.

The UEs 3 and the base station 5 are connected via an LTE air interface, the so-called "Uu" interface. The base station 5 (and hence the mobile device 3) is coupled to the core network 10 via an appropriate interface/reference point (in this example, an 'S1' interface/reference point).

The core network 10 includes, amongst other things, a Mobility Management Entity (MME) 7, a home subscriber server (HSS) 9, and a Service Capability Exposure Function (SCEF) 11. In the example of FIG. 3, a plurality of Application Servers (ASs) 13-1 to 13-3 are connected to the SCEF 11.

The MME 7 is coupled to the base station 5 via the S1 interface and is responsible for keeping track of the UEs 3 and for facilitating movement of the UEs 3 between the different base stations 5.

The HSS 9 is coupled to the MME via the so called 'S6a' interface/reference point and manages subscription-related information such as subscriber profiles for users. The HSS 9 performs authentication and authorization of a user, and can provide information about a subscriber's location and internet protocol (IP) information.

The SCEF 11 is responsible for authorising a particular service for a given subscriber and assists other core network nodes in deriving and applying appropriate rules for third party services. The SCEF 11 in this figure can communicate with the MME 7 via a new interface/reference point (referred to as the 'SCm' interface/reference point) and with the HSS via a new reference point (referred to as the 'SCh' interface/reference point).

It will be appreciated that one or each of the SCm and SCh interfaces may be a completely new interface or may be a modification of an existing interface. The SCm, interface may, for example, be based on a modified 'S6' or 'S6a' interface. The protocol(s) used over these interfaces may also comprise existing protocol(s) (e.g. Diameter or Radius or XML) or new protocol(s).

In the example of FIG. 3, the UEs 3 each may handle the communication for a plurality of (e.g. three) different applications at the same time. For example, one of the UEs 3-1 uses three applications at the same time whilst another UE 3-2 is coupled to three sensors 15-1, 15-2, and 15-3 each of which uses a different respective application the communication for which is provided by UE 3-2. The sensors, are thus connected via the UE 13-2 with the network, and are communicating independently with applications of three different ASs. This communication may be at the same time or in sequence.

In scenarios where a UE 3 handles the communication for multiple applications at the same time, then each AS 13 that provides an application may provide application specific communication pattern (CP) parameters to the SCEF 11 to allow derivation of relevant information (e.g. network parameters) from the CPs for that UE 3. Each CP may comprise a data traffic communication pattern, a mobility communication pattern and/or the like.

TR 23.708 v 1.1.0 provides a number of examples of parameters that the CP parameters provided to the SCEF 11 may comprise. The communication pattern may comprise, for example:

- a periodic communication indicator—which identifies whether the UE communicates periodically or not (e.g. may be set to TRUE to indicate that a UE communicates periodically or FALSE to indicate no periodic communication, e.g. only on demand);
- a communication duration timer—a duration interval time (e.g. 5 minutes) of periodic communication (e.g. where the periodic indicator is set to TRUE);
- a periodic time—interval time (e.g. every hour) of periodic communication;
- a scheduled communication time—time zone and day of the week when the UE is available for communication;
- an indicator of average data volume per communication (e.g. 2500 kB)—average data volume per communication;
- a stationary indication—which identifies whether the UE is stationary or mobile (e.g. may be set to TRUE to indicate that the UE is stationary or FALSE to indicate UE mobility);
- a stationary location—which may comprise UE location information for a stationary UE (e.g. a cell-id of a cell in which the UE is located or other location information which can be mapped to a cell-id in the network;
- a mobility area—which may comprise area information identifying an area in which the UE moves around. If this is not specified, then UE mobility may not be restricted (e.g. a list of cell-ids or a tracking area (TA) list or other location information which is able to be mapped to the cell-lists or a TA list in the network); and/or
- an average mobility speed—which may represent an average mobility speed for the UE (e.g. a speed in km/h or a speed range such as low/middle/high speed).

Figure 4:
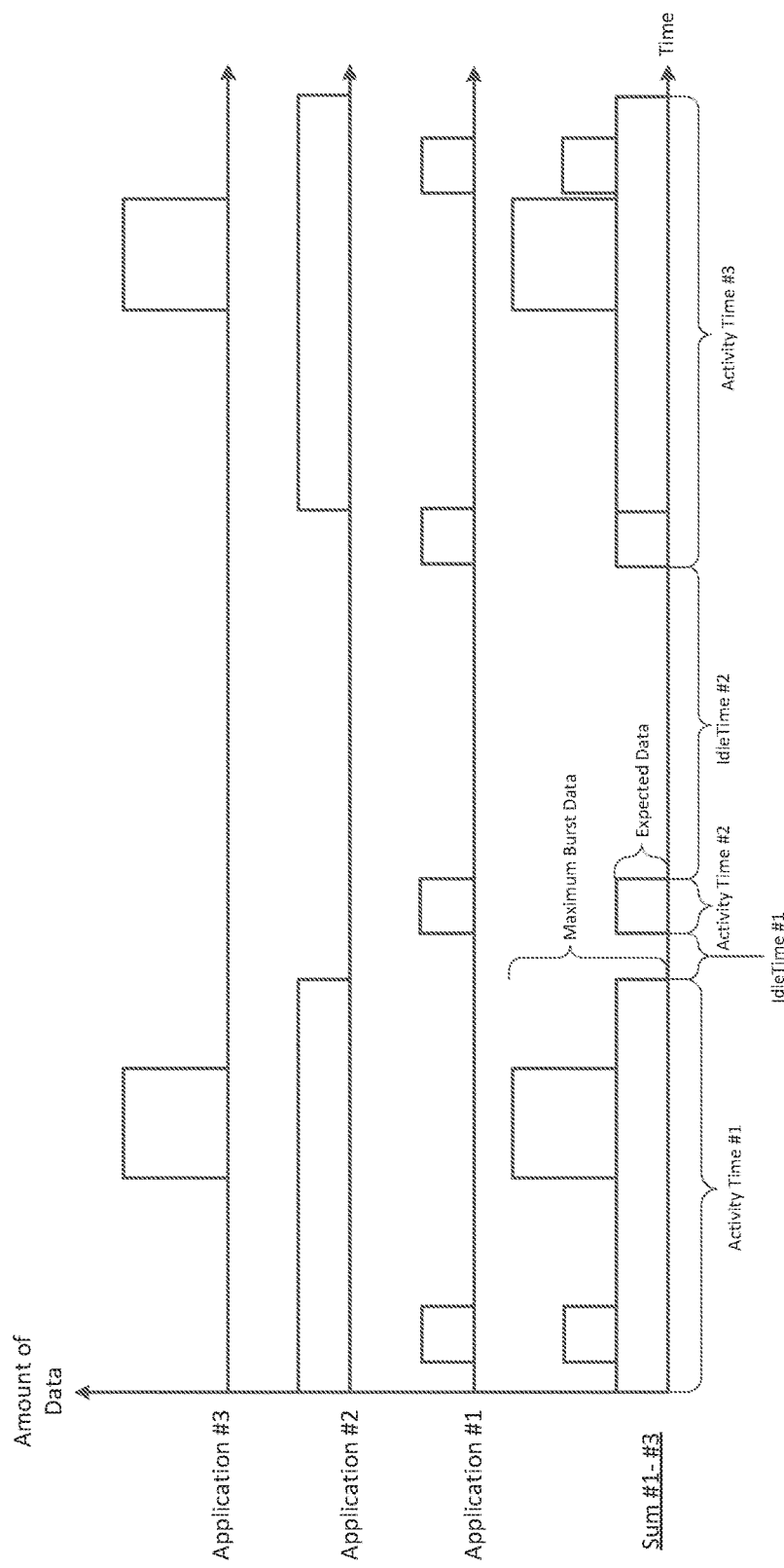
FIG. 4 is a simplified graph illustrating an exemplary scenario in which three applications have different communication patterns.

The effect of multiple applications having different communication patterns is illustrated in FIG. 4 in which communication patterns for three different applications being used by a particular UE 3 are shown for purely illustrative purposes. As seen in FIG. 4, one application (Application #1) is characterised by relatively frequent, short duration, small data burst. Another application (Application #2) is characterised by periodic, relatively long duration but low data bursts. Another application (Application #3) is characterised by periodic, relatively medium duration, high data bursts. The combined effect of the different respective communication patterns associated with each application is illustrated at the bottom of FIG. 4 which shows a relatively complex pattern having three distinct 'activity' periods in which there is communication activity. Each activity period has a different duration characterised by a different 'activity time'. Similarly the idle periods between the different activity periods are of different durations characterised by different 'idle' times.

Beneficially, in this example, when an AS 13 provides a CP for an application of a UE 3 that is already using (or at least providing communication for) one or more other applications, a new set of network parameters are derived (by the SCEF or by another communication node/function)

that represent the overall traffic behaviour for the plurality of different applications (e.g. as illustrated in FIG. 4) for that UE 3.

Beneficially, in order to support the efficient update of parameters, when a CP is provided for a specific UE 3, information ('validity information') may be provided that indicates the conditions under which the CP remains valid. This validity information may comprise any suitable information but typically comprises information identifying a validity time that represents how long the CP (and hence any network parameters derived from it) remain valid.

As an alternative or in addition to the provision of validity information such as a validity timer, when a CP is provided for a specific UE 3 information identification may be provided for that CP (e.g. a 'CP ID') with an associated flag or 'trigger' (e.g. a 'status' flag) to indicate whether or not that CP should be activated. The status flag can be set to 'activate' to indicate that the CP should be 'activated' (i.e. considered for the purposes of network parameter derivation) or 'deactivate' to indicate that the CP should be treated as 'deactivated' (i.e. not considered, at present, for the purposes of network parameter derivation). A CP that is not 'activated' for a particular UE 3 may nevertheless be stored for later activation by means of an appropriate message with a status flag associated with that CP, and UE 3, set to 'activate'. Similarly, a CP that is 'activated' for a particular UE 3 may be deactivated later by means of an appropriate message with a status flag associated with that CP, and UE 3, set to 'deactivate'.

It can be seen, therefore, that each time a new CP is received from an AS 13 for the same UE 3, when the validity of a CP for that UE expires, or when a CP for the UE 3 is activated/deactivated, there may be an associated change in the accumulated active CPs per UE 3. When there is such a change in the accumulated active CPs per UE 3, therefore, the sum of the CPs for each UE is considered when new or updated network parameters are derived (by the SCEF or by another communication node/function).

Referring in particular to FIG. 4, examples of network parameters for derivation may comprise: Maximum Bit Rate (MBR), maximum burst data, average bitrate, expected bitrate, average activity interval, average idle interval, and/or the like.

The network parameters derived from the sum of the CPs may vary based on the characteristics of the CP's data traffic communication pattern, e.g. periodicity etc.

It will be appreciated that the term 'network parameters' is used to express parameters derived or mapped based on the CP parameters (in the SCEF or in another communication node/function). The term network parameters covers more specific parameter sets such as, for example, 'UE behaviour parameters', 'CN assisted eNB parameters' or any other parameters derived from a CP and used in the network to optimize the use of network resources or to adapt a communication link for a corresponding UE. For example 'network parameters' comprising 'UE behaviour parameters' may describe UE behaviour with respect to sending or receiving data or mobility behaviour. The UE behaviour may be translated into or expressed by 'UE behaviour parameters' which can be processed in the network functions, e.g. serving node or base station (eNB). The network parameters may, for example, include: UE activity time; UE idle time; Handover interval; Data size; Data rate; and/or the like.

UE

Figure 5:
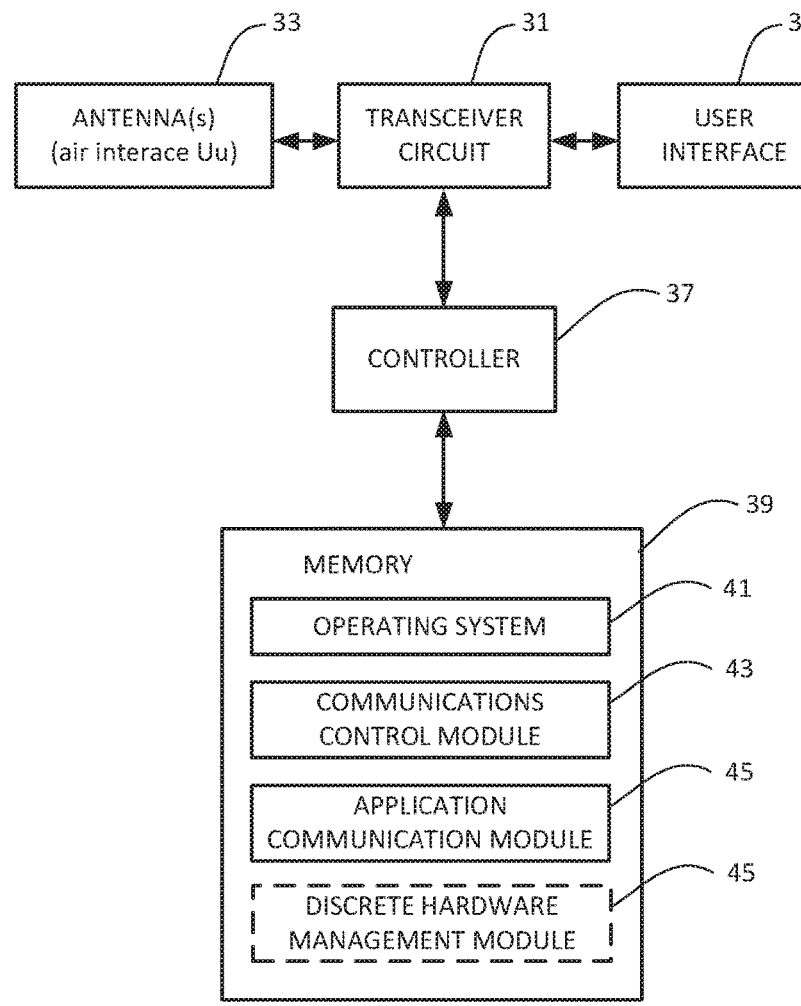
FIG. 5 is an exemplary block diagram illustrating the main functionalities of a UE of the system shown in FIG. 3.

FIG. 5 is a block diagram illustrating the main components of user equipment 3 such as that shown in FIG. 3. As shown, the user equipment 3 has a transceiver circuit 31 that is operable to transmit signals to and to receive signals from a base station 5 via one or more antenna 33 (e.g. over the Uu interface). Although not necessarily shown in FIG. 5, the UE 3 may of course have all the usual functionality of a conventional cellular communication device 3 (such as a user interface 35) and this may be provided by any one or any combination of hardware, software and firmware, as appropriate. The UE 3 has a controller 37 to control the operation of the mobile telephone 3. The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the UE3 by, in this example, program instructions or software instructions stored within memory 39. As shown, these software instructions include, among other things, an operating system 41, a communications control module 43 and an application communication module 45. The software instructions may also include a discrete hardware management module 47 if appropriate.

The communications control module 43 is operable to control the communication between the mobile telephone 3 and the base station 5.

The application communication module 45 is responsible for handling managing communication for applications provided by the application servers (ASs) of third party service provider in accordance with appropriate communication patterns (CPs) for that application. Where the UE 3 has one or more associated discrete hardware device(s) (which may be internal or external to the UE), such as sensors 15, the discrete hardware management module 47 manages operation of that discrete hardware. It will be appreciated that where such discrete hardware is used, the UE 3 will also have hardware and/or software for wired or wireless connection to the discrete hardware.

Base Station (e.g. eNB)

Figure 6:
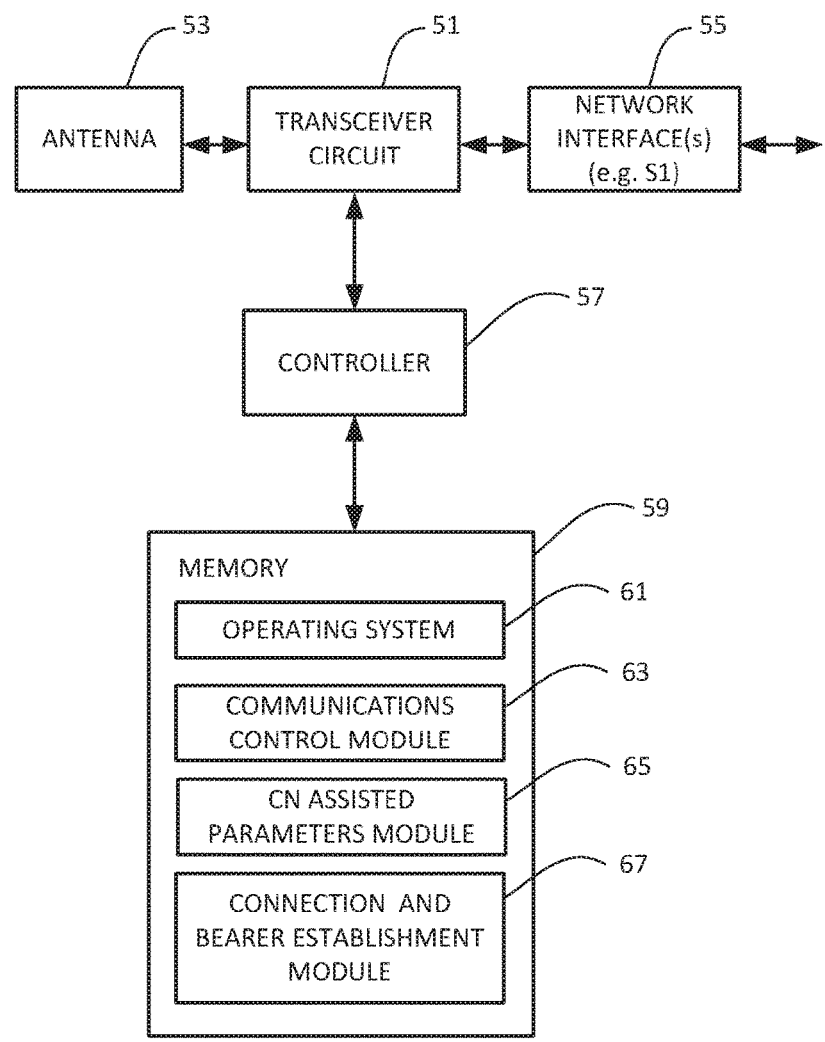
FIG. 6 is an exemplary block diagram illustrating the main functionalities of an eNB of the system shown in FIG. 3.

FIG. 6 is a block diagram illustrating the main components of the base station 5 shown in FIG. 3. As shown, the shared base station 5 includes transceiver circuitry 51 which is operable to transmit signals to and to receive signals from the UEs 3 via one or more antennae 53 (e.g. over the Uu interface) and which is operable to transmit signals to and to receive signals from the core network 10 via a network interface 55 (e.g. with the MME 7 over the S1 interface). It will be appreciated that in addition to the network interface typically including an S1 interface for communicating with core network entities the network interface may comprise other interfaces such as an X2 interface for communicating with other base stations. Although not necessarily shown in FIG. 6, the base station 5 may of course have all the usual functionality of a conventional base station 5 and this may be provided by any one or any combination of hardware, software and firmware, as appropriate.

A controller 57 controls the operation of the transceiver circuitry 51 in accordance with software stored in memory 59. The software includes, among other things, an operating system 61, a communications control module 63, a CN assisted parameters module 65, and a connection and bearer establishment module 67.

The communications control module 63 is operable to control the communication between the base station 5 and the UEs 3 and other network entities that are connected to the base station 5. The communications control module 63 also controls the separate flows of uplink and downlink user traffic and control data to be transmitted to the communications devices served by the base station 5 including, for example, control data for managing operation of the UEs 3.

The CN assisted parameters module 65 is responsible for obtaining and managing the CN assisted eNB parameters derived elsewhere in the network (e.g. by the MME 7, HSS 9 and/or SCEF 11) and provided to the base station 5. The connection and bearer establishment module 67 is responsible for managing setup of S1 connections and establishment of communication bearers for communication by the UEs 3. The connection and bearer establishment module 67 uses the CN assisted eNB parameters, when configuring a radio link with the UE, to do so in a manner in which transitions between IDLE and CONNECTED states are minimized.

Mobility Management Entity

Figure 7:
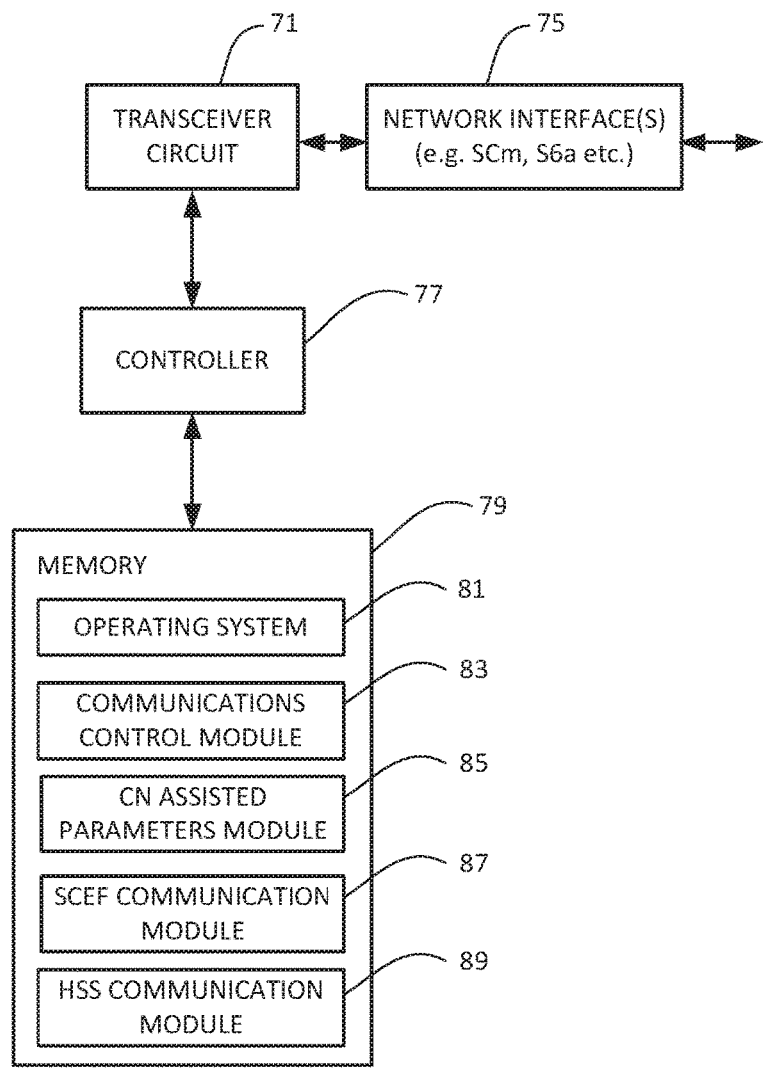
FIG. 7 is an exemplary block diagram illustrating the main functionalities of a MME of the system shown in FIG. 3.

FIG. 7 is a block diagram illustrating the main components of a mobility management entity 7 for the communication system of FIG. 3. As shown, the MME 7 includes transceiver circuitry 71 which is operable to transmit signals to and to receive signals from the base station 5 and/or other nodes (e.g. HSS 9 and/or SCEF 11) via network interface(s) 75. Although not necessarily shown in FIG. 7, the MME 7 may of course have all the usual functionality of a conventional MME 7 and this may be provided by any one or any combination of hardware, software and firmware, as appropriate.

A controller 77 controls the operation of the transceiver circuitry 71 in accordance with software stored in memory 79. The software includes, among other things, an operating system 81, a communications control module 83, a CN assisted parameters module 85, an SCEF communication module 87 and an HSS communication module 89.

The communications control module 83 is operable to control the communication between the MME 7 and other network entities that are connected to the MME. Such communication may relate to, for example, for facilitating mobility of the UEs 3 between the different base stations 5.

The CN assisted parameters module 85 is responsible for obtaining CN assisted eNB parameters. The CN assisted parameters module 85 may obtain these parameters by deriving them in the MME 7 (e.g. from network/CP parameters obtained from the HSS 9 and/or SCEF 11). The CN assisted parameters module 85 may obtain these parameters by receiving them directly or indirectly from another network entity (e.g. HSS 9 and/or SCEF 11) that has derived them. The CN assisted eNB parameters (or network parameters from which CN assisted eNB parameters may be derived) may be obtained from information pushed to the MME 7 using the DIAMETER or any other suitable protocol (e.g. from a DIAMETER Insert Subscriber Data message) or may be downloaded (e.g. with subscriber data in a DIAMETER Update Location Answer).

The CN assisted parameters module 85 is also responsible for handling validity information related to the network/CP parameters received by the MME 7 appropriately.

For example, the CN assisted parameters module 85 may start a timer with the duration of a validity time indicated for a CP from which the network parameters are derived and to trigger deletion of the stored parameters (or calculation of the eNB-assisted parameters, without taking into account expired network parameters from the subscription information). The CN assisted parameters module 85 may consider the network parameters from the subscription information, when calculating eNB-assisted parameters, only for a time period when the network parameters are indicated to be valid (for example between specified times of day).

The CN assisted parameters module 85 is also responsible for providing CN assisted eNB parameters to the base station 5 (for example during the setup of an S1 signalling connection (e.g., Attach, Service Request) as set out in section 4.3.21.3 of TS 23.401 v 13.2.0).

The SCEF communication module 87 is responsible for managing communication with the SCEF 11 via the SCm interface (where such an interface is provided). The HSS communication module 89 is responsible for managing communication with the HSS 9 via the S6a interface.

Home Subscriber Server

Figure 8:
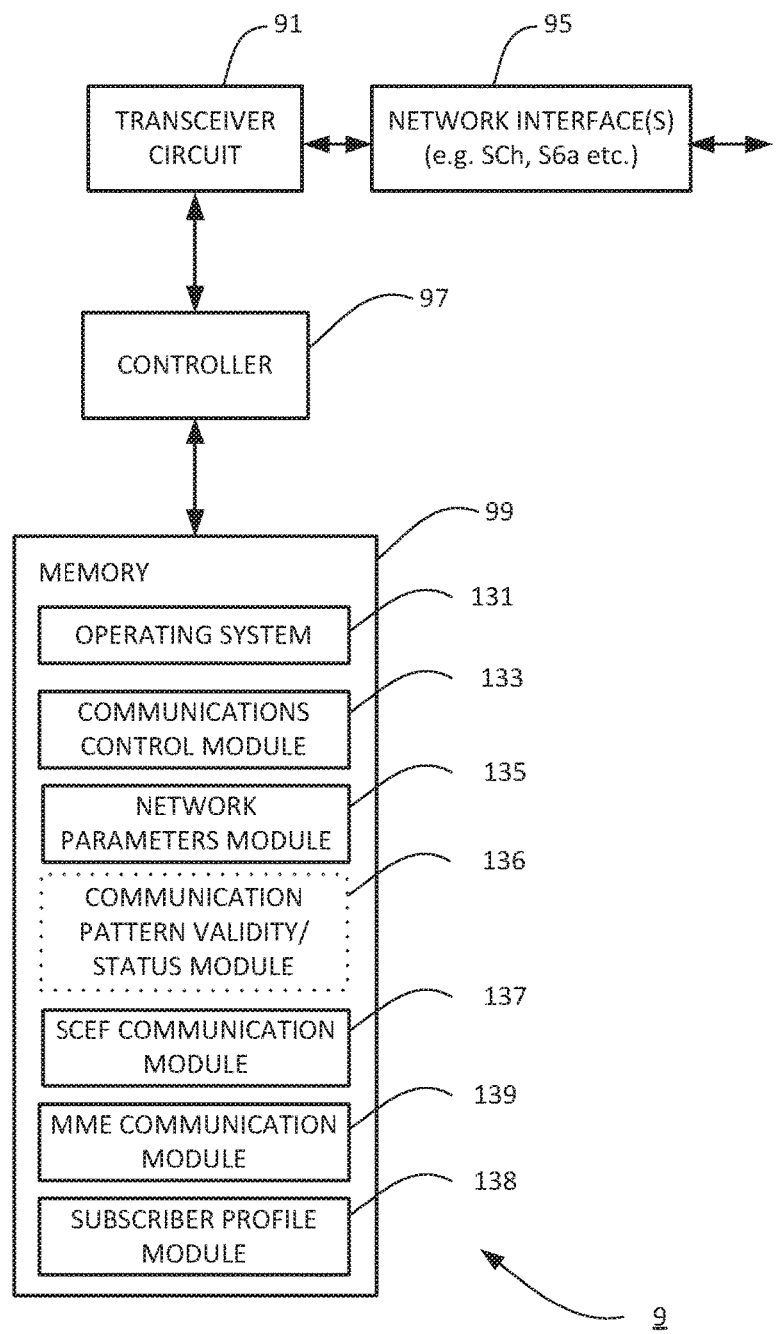
FIG. 8 is an exemplary block diagram illustrating the main functionalities of a HSS of the system shown in FIG. 3.

FIG. 8 is a block diagram illustrating the main components of a home subscriber server 9 for the communication system of FIG. 3. As shown, the HSS 9 includes transceiver circuitry 91 which is operable to transmit signals to and to receive signals from the MME 7 and SCEF 11 via network interface(s) 95. Although not necessarily shown in FIG. 8, the HSS 9 may of course have all the usual functionality of a conventional HSS 9 and this may be provided by any one or any combination of hardware, software and firmware, as appropriate.

A controller 97 controls the operation of the transceiver circuitry 91 in accordance with software stored in memory 99. The software includes, among other things, an operating system 131, a communications control module 133, a network parameters module 135, an SCEF communication module 137, an MME communication module 139 and a subscriber profile module 138. The software may also include a communication pattern validity/status module 136.

The communications control module 133 is operable to control the communication between the HSS 9 and other network entities that are connected to the HSS 9. Such communication may relate to, for example, performing authentication and authorization of a user, and providing information about a subscriber's location and internet protocol (IP) information.

The network parameters module 135 is responsible for obtaining and storing network parameters and, where applicable, for obtaining and storing related communication pattern parameter sets. The network parameters may be general network parameters derived from communication pattern parameters or more specific network parameters such as UE behaviour parameters or CN assisted eNB parameters. The network parameters module 135 may obtain these parameters by deriving them in the HSS 9 (e.g. from one or more communication pattern parameter set(s) received from SCEF 11). The network parameters module 135 may obtain these parameters by receiving them from the SCEF 11 (e.g. over the SCh interface) if the SCEF 11 has derived them. The network parameters (or CP parameters from which network parameters may be derived) may be obtained using the DIAMETER or any other suitable protocol (e.g. in a Profile-Update-Request DIAMETER message).

The network parameters module 135 is also responsible for providing the network/CP parameters to the MME 7 using the DIAMETER or any other suitable protocol (e.g. by 'pushing' subscription information comprising the network/CP parameters to the MME 7 in a DIAMETER Insert Subscriber Data message). The MME 7 may alternatively download the network parameters (e.g. with subscriber data in a DIAMETER Update Location Answer).

The SCEF communication module 137 is responsible for managing communication with the SCEF 11 via the SCh interface (where such an interface is provided). The MME communication module 139 is responsible for managing communication with the MME 7 via the S6a interface.

The subscriber profile module 138 stores subscriber profiles (and appropriate subscription parameters) associated with subscribers of the home network (e.g. the subscriber of the UEs 3).

Where applicable, the communication pattern validity/status module 136 is responsible for managing the validity/status of CPs and associated CP/network parameters. The communication pattern validity/status module 136 tracks the validity/status of CPs triggers update of the stored CP/network parameters autonomously if validity/status information for that CP (and hence for the associated network parameters) indicates that such update is required. For example if a validity time for a particular CP expires then the associated CP parameters may be deleted autonomously. Alternatively or additionally, if status information is received which indicates that a particular 'active' CP is to be 'deactivated' then the associated CP parameters may be deleted autonomously (or may be retained in a deactivated state until activated by a further status update). Following expiry of validity, or following deactivation, the network parameters module 135 can re-derive the network parameters to take the other CPs for the same UE 3 into consideration while ignoring the CPs that have become invalid or deactivated.

Service Capability Exposure Function

Figure 9:
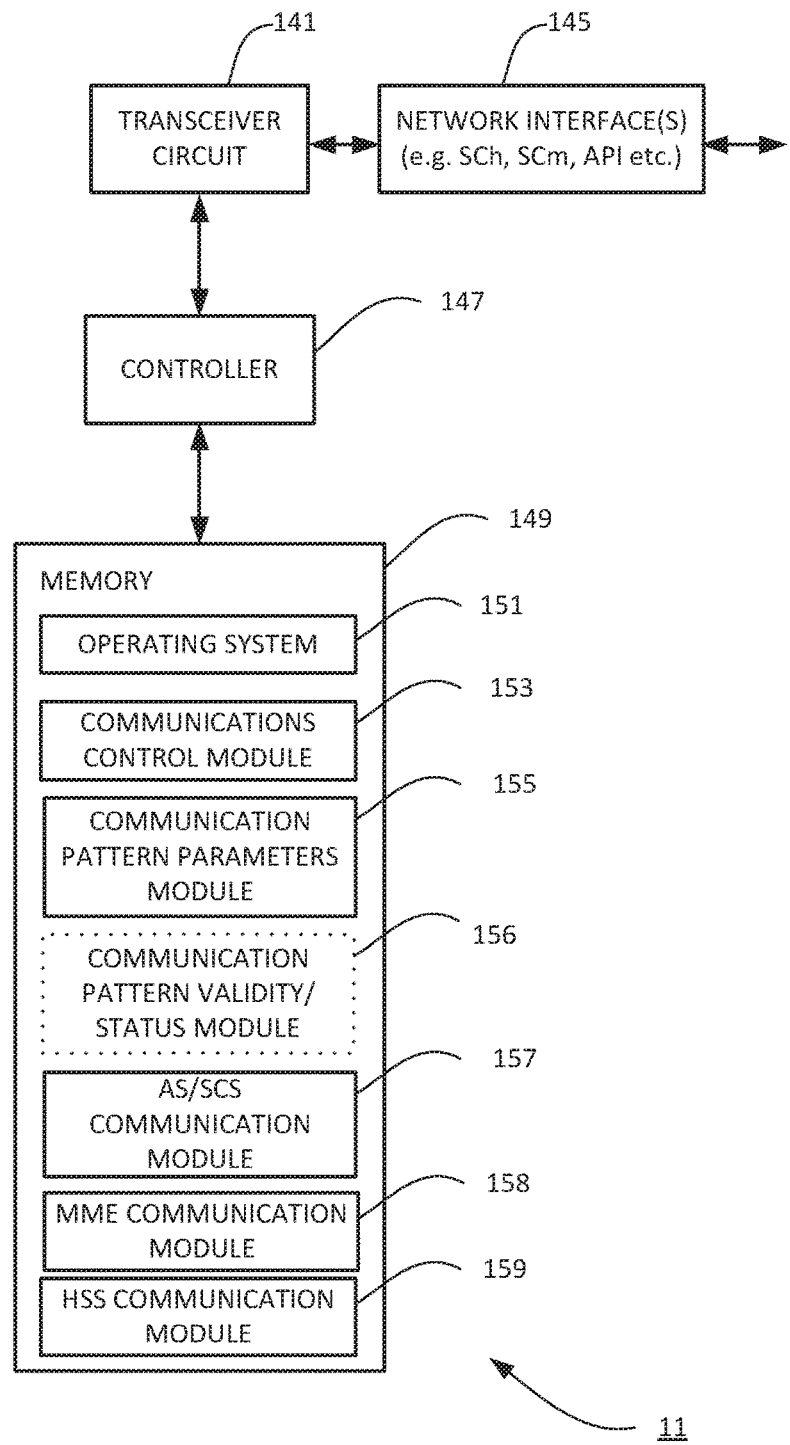
FIG. 9 is an exemplary block diagram illustrating the main functionalities of a SCEF of the system shown in FIG. 3.

FIG. 9 is a block diagram illustrating the main components of a Service Capability Exposure Function (SCEF) 11 for the communication system of FIG. 3. As shown, the SCEF 11 includes transceiver circuitry 141 which is operable to transmit signals to and to receive signals from the HSS 9 and AS/SCS 13 via network interface(s) 145. Although not necessarily shown in FIG. 9, the SCEF 11 may of course have all the usual functionality of a conventional SCEF 11 and this may be provided by any one or any combination of hardware, software and firmware, as appropriate.

A controller 147 controls the operation of the transceiver circuitry 141 in accordance with software stored in memory 149. The software includes, among other things, an operating system 151, a communications control module 153, a communication pattern parameters module 155, an AS/SCS communication module 157, an MME communication module 158, and an HSS communication module 159. The software may also include a communication pattern validity/status module 156.

The communications control module 153 is operable to control the communication between the SCEF 11 and other network entities that are connected to the SCEF 11.

The communication pattern parameters module 155 is responsible for obtaining and storing communication pattern parameter sets and, in applicable examples, for deriving associated network parameters (which may be general network parameters derived from communication pattern parameters or more specific network parameters such as UE behaviour parameters or CN assisted eNB parameters). The communication pattern parameters module 155 obtains communication pattern parameters from an associated AS/SCS 13 of a third party service provider.

The communication pattern parameters module 155 is also responsible for providing derived network parameters (or, where applicable communication pattern parameters) to the SCEF 11 using the DIAMETER or any other suitable protocol (e.g. in a Profile-Update-Request DIAMETER message).

The AS/SCS communication module 157 is responsible for managing communication with the AS/SCS 13 (e.g. via an appropriate application interface (API)).

The MME communication module 158 is responsible for managing communication with the MME 7 via the SCm interface (where such an interface is provided).

The HSS communication module 159 is responsible for managing communication with the HSS 9 via the SCh interface (where such an interface is provided).

Where applicable, the communication pattern validity/status module 156 is responsible for managing the validity/status of CPs and associated CP/network parameters. The communication pattern validity/status module 156 tracks the validity/status of CPs triggers update of the stored CP/network parameters autonomously if validity/status information for that CP (and hence for the associated network parameters) indicates that such update is required. For example if a validity time for a particular CP expires then the associated CP parameters may be deleted autonomously in the SCEF 11. Alternatively or additionally, if status information is received which indicates that a particular 'active' CP is to be 'deactivated' then the associated CP parameters may be deleted autonomously (or may be retained in a deactivated state until activated by a further status update). Following expiry of validity, or following deactivation, the communication pattern parameters module 155 can re-derive the network parameters to take the other CPs for the same UE 3 into consideration while ignoring the CPs that have become invalid or deactivated.

Application Server/Service Capability Server

Figure 10:
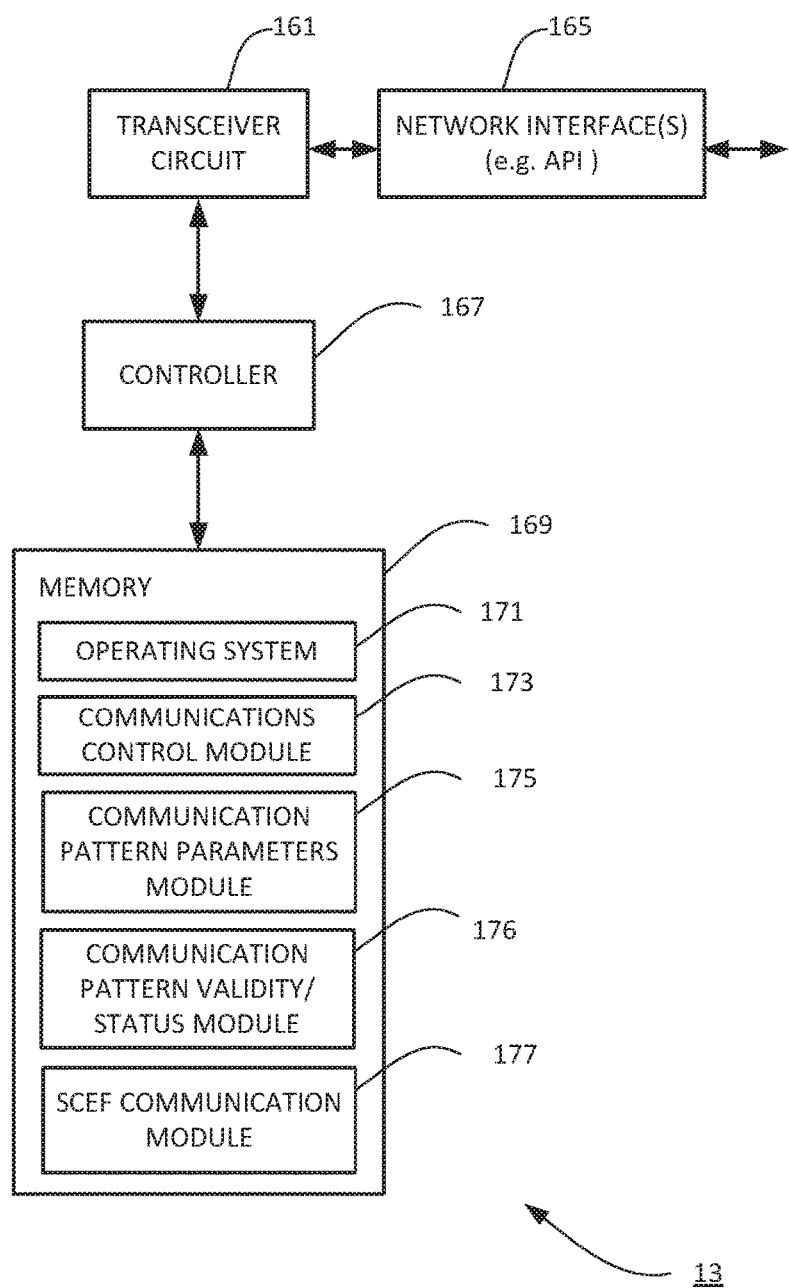
FIG. 10 is an exemplary block diagram illustrating the main functionalities of an AS/SCS of the system shown in FIG. 3.

FIG. 10 is a block diagram illustrating the main components of an Application Server/Service Capability Server 13 for the communication system of FIG. 3. As shown, the AS/SCS 13 includes transceiver circuitry 161 which is operable to transmit signals to and to receive signals from the SCEF 11 via network interface(s) 165. Although not necessarily shown in FIG. 10, the AS/SCS 13 may of course have all the usual functionality of a conventional AS/SCS 13 and this may be provided by any one or any combination of hardware, software and firmware, as appropriate.

A controller 167 controls the operation of the transceiver circuitry 161 in accordance with software stored in memory 169. The software includes, among other things, an operating system 171, a communications control module 173, a communication pattern parameters module 175, a communication pattern validity/status module 176 and an SCEF communication module 177.

The communications control module 173 is operable to control the communication between the AS/SCS 13 and other network entities that are connected to the AS/SCS 13.

The communication pattern parameters module 175 is responsible for generating communication pattern parameter sets for applications used by the UE 3 or used by discrete hardware (e.g. sensors) that use the UE 3 for communication.

The communication pattern validity/status module 176 is responsible for managing the validity/status of CPs and for generating appropriate validity information (e.g. validity times) or status information (e.g. status flags to activate/deactivate triggers).

The SCEF communication module 177 is responsible for managing communication with the SCEF 11 (e.g. via an appropriate application interface (API)) such as the provision of communication pattern parameter sets and associated validity/status information.

Operation

Use of Validity Information

Figure 11:
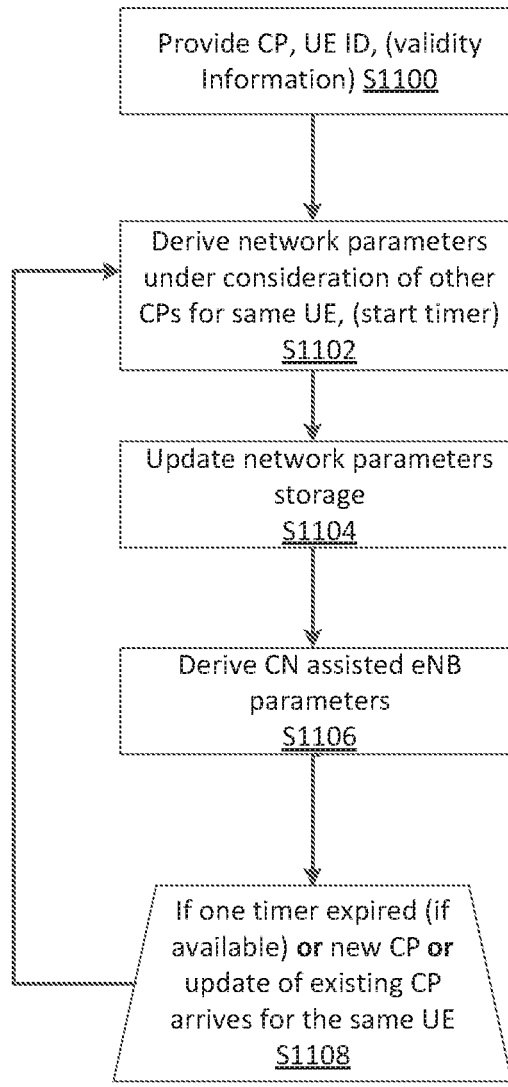
FIG. 11 is a flow chart illustrating, in simplified overview, a node independent call flow of the functionality that is typically executed in pursuance of the provision and use of a communication pattern (CP) with associated validity information.

FIG. 11 is a flow chart illustrating, in simplified overview, a node independent call flow of the functionality that is typically executed in pursuance of the provision and use of a communication pattern (CP) with associated validity information such as a validity time or the like.

It will be appreciated that, as described in more detail later, the functionality of each block shown in FIG. 11 can be located in different functional entities or nodes (for example, SCEF, HSS, MME, eNB or any other involved node).

As seen in FIG. 11, the flow begins at S1100 when a CP is provisioned for a specific UE (represented by an associated UE ID). The CP request in this example contains the CP parameters and validity information for the CP. The validity information for the CP (which also represents validity information for the corresponding network parameters when derived) can be, for example, a validity time that can be expressed in various ways, for example:

- a time interval for which the CP is valid (for example representing the upcoming 60 minutes); or
- a time period for which the CP should be considered in the network (for example representing the day hours when a CP is active such as 'from 23:00 to 24:00 hours' on the 24 hour clock).

It can be seen, therefore, that the validity information for a given set of network parameters effectively describes when a UE 3 uses the application with the corresponding CP or behaviour. If the validity information is missing, then the network assumes the CP valid until the AS 13 provides an update for that CP.

At S1102 appropriate network parameters are derived taking into account the new CP. If the UE 3 for which the CP has been provided already has other associated CPs (e.g. for applications being used simultaneously on the UE or being used by other entities connected via the UE) then the derivation of network parameters takes the other CPs for the same UE 3 into consideration. Where a validity time has been provided that sets a period for which the associated CP is valid then a timer is started to allow the network to determine when the CP is valid and when the CP ceases to be valid.

Once the network parameters are updated they are stored in the network, at S1004 until the next update (e.g. an update to an existing CP or provision of a new CP for a new application).

The network parameters are then used to derive the CN assisted eNB parameters at S1006.

If, at S1008, a timer (e.g. a validity timer) that has been set expires (if available), a new CP arrives for the same UE, or there is an update of an existing CP for that UE 3, then the network parameters are re-derived under consideration of the change in the active CPs at S1002 and the process essentially repeats.

This applies also for the examples shown in following figures, which show examples when the different functionalities are located in SCEF, HSS and MME.

Timer Handling and NW Parameters in SCEF, CN Assisted eNB Parameters in MME

Figure 12:
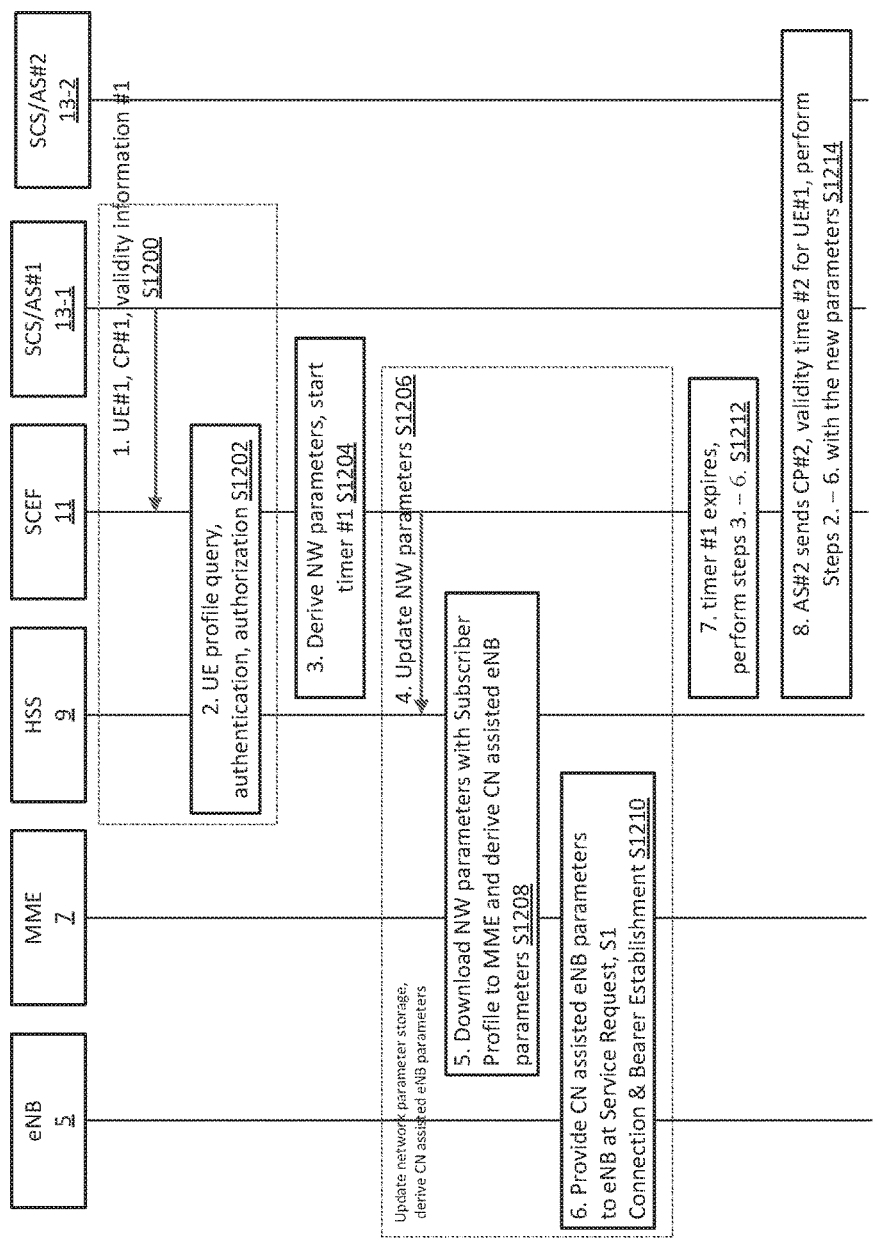
FIGS. 12 to 14 are exemplary message sequence diagrams illustrating methods performed by components of the mobile telecommunication system of FIG. 3 whilst carrying out the exemplary flow of FIG. 11.

FIG. 12 is a message sequence diagram illustrating, in simplified overview, an example in which the validity of the network parameters is handled in the SCEF 11. In this example, the SCEF 11 is able to store and/or process and/or further signal the network parameters in timely manner, e.g. to start and terminate timers or activate and deactivate network parameters.

Step 1 (S1200): An application server (AS)/service capability server (SCS) 13-1 of a 3rd party service provider sends a request or notification to the SCEF 11 with a set of CP parameters for a new or updated communication pattern for the UE or group of UEs communicating with the AS/SCS 13-1. The request/notification typically contains the UE ID(s), the CP parameter set and, if available, the corresponding validity information. The request/notification may also contain the ID of the requesting AS/SCS (e.g. AS ID). It will be appreciated that these are exemplary information elements and the request message may include other information elements in addition to or as an alternative to these elements.

Step 2 (S1202): The SCEF 11 may query the HSS 9 for additional information, and to perform an authentication and/or authorization procedure to authenticate/authorize the request. The HSS 9 may, at this stage, provide an indication of its Architecture Enhancements for Service Exposure (AESE) capability support to the SCEF 11. For example, the HSS 9 may provide a list of supported AESE-related features of the HSS 9 and serving node to the SCEF 11. The SCEF 11 proceeds with the next step (step 3) only if the feature of CN assisted eNB parameter tuning is supported in HSS 9 and serving node and discards or rejects further requests in the case of no support.

The SCEF 11 may send back to the AS/SCS 13-1 a negative reply indicating that the request from the AS/SCS 13-1 cannot be processed or served in the network in the following exemplary cases:

- If HSS 9 or MME 7 does not support a given AESE-related feature which was requested by the AS/SCS 13-1
- If the authentication or authorization procedure between SCEF 11 and HSS 9 was not successful.

Step 3 (S1204): If the CP parameter set is accompanied with validity information, then a corresponding timer is started in the SCEF 11, either at once or at a time, indicated by the validity information, when the CP is to become active. The SCEF 11 derives (or maps) the network parameters from the CP parameters based on operator policy or configuration under consideration of all active CPs (i.e. CPs for which validity information is available and not expired) for a particular UE 3. When the validity timer for a certain CP expires, the network parameters are derived (or mapped) again to take account of the absence of the CP (e.g. a missing data traffic pattern) that does not need to be considered anymore.

Step 4 (S1206): The SCEF 11 provides the derived or mapped network parameters to the HSS 9, where they are stored by the HSS 9 in a subscriber profile. The message in this step 4 may contain at least one of the following information: UE ID, SCEF ID, application (or service) ID (or information), network parameter(s), validity information, etc. The protocol used by the SCEF 11 may be, for example, DIAMETER or RADIUS or XML but is not limited to this. In case of DIAMETER, the message may be a Profile-Update-Request message as indicated below (but could be any other DIAMETER message sent to the HSS 9):

```
< Profile-Update-Request > ::      = < Diameter Header: 307,
   REQ, PXY, 16777217>
         < Session-Id >
         { Vendor-Specific-Application-Id }
         { Auth-Session-State }
         { Origin-Host }
         { Origin-Realm }
         [ Destination-Host ]
         { Destination-Realm }
         *[ Supported-Features ]
         { User-Identity }
         [ Wildcarded-Public-Identity ]
         [ Wildcarded-IMPU ]
```

-continued

```
[ User-Name ]
*{ Data-Reference }
{ User-Data }
[ OC-Supported-Features ]
*[ AVP ]
*[ Proxy-Info ]
*[ Route-Record ]
*[Network Parameters]
```

The new field/attribute value-pair (AVP) 'Network Parameters' in the exemplary Profile-Update-Request message will typically contain one or more of the values: MBR; maximum burst data; average bitrate; expected bitrate; average activity interval; average idle interval; stationary indication; speed etc.

It will be appreciated that by if an SCm reference point is present, then the message may be sent directly to the serving node 9 (e.g. MME, SGSN) of the UE 3 without traversing the HSS 9 (in which case, the following step, step 5, may be unnecessary).

Step 5 (S1208): The HSS 9 stores the received network parameters with validity information in the respective UE subscription information. The HSS 9 can update these stored network parameters autonomously if the validity of certain network parameters expires.

The HSS 9 can push the updated subscription information to the MME 7 (e.g. in a DIAMETER Insert Subscriber Data message including one or more of the fields like UE ID, SCEF ID, application (or service) ID (or information), network parameter(s), validity information etc.), or alternatively the MME 7 can download the network parameters with the subscriber data in the DIAMETER Update Location Answer.

The MME 7 can then derive the CN assisted eNB parameters based on the network parameter(s) in the received subscription information and/or based on additional statistic information.

Step 6 (S1210): The MME provides the CN assisted eNB parameters to the eNB during the setup of an S1 signalling connection (e.g., Attach, Service Request), for example, as set out in section 4.3.21.3 of TS 23.401 v 13.2.0.

Step 7 (S1212): When one of the validity timers for a CP of the UE 3 expires, then the steps 3.-6. are performed again, to ensure that the correct network parameters are available for the currently active CP or set of CPs, since the network parameters may change due to the CP to which the expired validity timer relates being removed from consideration.

Step 8 (S1214): When a new CP from another AS/SCS 13-1, 13-2 or an update to an existing CP is sent to the SCEF 11, then the steps 2.-6 are performed again, to ensure that the correct network parameters are available for the currently active CP or set of CPs, since the network parameters may change due to new or updated CP.

Figure 13:
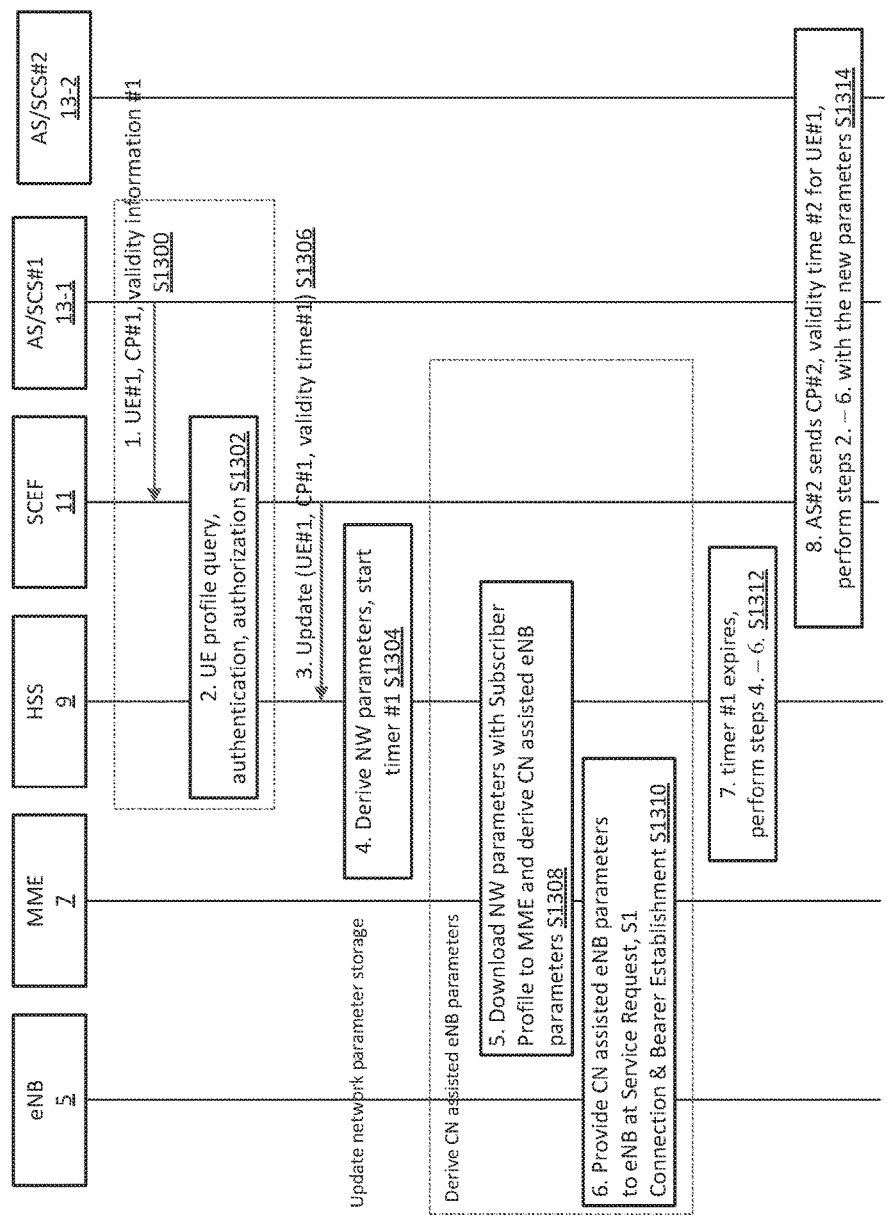

Timer Handling and NW Parameters in HSS and MME, CN Assisted eNB Parameters in MME FIG. 13 is a message sequence diagram illustrating, in simplified overview, an example in which the validity of the network parameters is handled in the HSS 9. In this example, the HSS 9 is able to store and/or process and/or further signal the network parameters in timely manner, e.g. to start and terminate timers or activate and deactivate network parameters.

FIG. 13 is similar to FIG. 12 with some modifications, where the modifications include, in particular that the validity handling is in the HSS.

Step 1 (S1300): An application server (AS)/service capability server (SCS) 13-1 of a 3rd party service provider sends a request or notification to the SCEF 11 about a new or updated communication pattern for the UE or group of UEs communicating with the AS/SCS 13-1. The request/notification typically contains the UE ID(s), the CP and if available the corresponding validity information, and may also contain the ID of the requesting AS/SCS (e.g. AS ID).

Step 2 (S1302): The SCEF 11 may query the HSS 9 for additional information, and to perform an authentication and/or authorization procedure to authenticate/authorize the request. The HSS 9 may, at this stage, provide an indication of its Architecture Enhancements for Service Exposure (AESE) capability support to the SCEF 11. For example, the HSS 9 may provide a list of supported features of the HSS 9 and serving node to the SCEF 11. The SCEF 11 proceeds with the next step (step 3) only if the feature of CN assisted eNB parameter tuning is supported in HSS 9 and serving node and discards or rejects further requests in the case of no support.

Step 3 (S1306): The SCEF 11 provides the received information (e.g. UE ID, CP parameter set(s) and, if available, the corresponding validity information) to the HSS 9. The message in this step may, for example, contain at least one of the following information: UE ID, SCEF Reference ID (SCEF ID), application (or service) ID (or information), CP parameter set(s), validity information, etc. The protocol used by the SCEF 11 may be DIAMETER but is not limited to this. In case of DIAMETER, the message may be a Profile-Update-Request message as indicated below (but could be any other DIAMETER message sent to the HSS 9):

```
< Profile-Update-Request > ::   = < Diameter Header: 307,
REQ, PXY, 16777217 >
        < Session-Id >
        { Vendor-Specific-Application-Id }
        { Auth-Session-State }
        { Origin-Host }
        { Origin-Realm }
        [ Destination-Host ]
        { Destination-Realm }
        *[ Supported-Features ]
        { User-Identity }
        [ Wildcarded-Public-Identity ]
        [ Wildcarded-IMPU ]
        [ User-Name ]
        *{ Data-Reference }
        { User-Data }
        [ OC-Supported-Features ]
        *[ AVP ]
        *[ Proxy-Info ]
        *[ Route-Record ]
        *[Communication Pattern]
```

The new field/attribute value-pair (AVP) 'Communication Pattern' in the exemplary Profile-Update-Request message will typically contain one or more of the parameter values describing the traffic and mobility behaviour as received by the SCEF 11 from the AS/SCS 13-1. Examples include periodic communication indicator, Communication duration timer, Periodic time, Scheduled communication time, Average data volume per communication, Stationary indication, Stationary location, Mobility area, Average mobility speed etc. In addition the new field/AVP 'Communication Pattern' may contain the corresponding validity information. The HSS stores the new CP parameter set (typically along with the associated SCEF Reference ID (SCEF ID) and validity information (e.g. validity time).

Step 4 (S1304): If the CP parameter set received by the HSS 9 is accompanied with validity information, then a corresponding timer is started in the HSS 9, either at once or at a time, indicated by the validity information, when the CP is to become active. The HSS 9 derives the network parameters based on operator policy or configuration under consideration of all currently active CPs (i.e. having validity information that is available and is not expired) for a particular UE 3. When the validity timer for a CP parameter set stored in the HSS 9 expires, then the parameters for that CP may be deleted and the network parameters derived again to take account of the absence of the CP (e.g. a missing data traffic pattern) that does not need to be considered anymore.

Step 5 (S1308): The HSS 9 stores the derived network parameters, together with the associated validity information, in the respective UE subscription information (subscriber profile). As indicated above, the HSS 9 can update the stored CP/network parameters autonomously if the validity of a certain CP and hence the associated network parameters expires (i.e. by deleting expired CP parameters and/or re-deriving network parameters as described above) thereby avoiding the need for additional signalling. The HSS 9 can push the updated subscription information to the MME, e.g. in a DIAMETER Insert Subscriber Data message, including one or more of the fields like UE ID, SCEF ID, application (or service) ID (or information), network parameter(s), validity information, etc. As an alternative to the pushing of network parameters to MME 7, the MME 7 can download the network parameters with the subscriber data in the DIAMETER Update Location Answer.

The MME 7 can then derive the CN assisted eNB parameters based on the network parameter(s) in the received subscription information and/or based on additional statistic information.

If the MME 7 receives 'validity information' related to the network parameters, the MME 7 is able to handle the validity information appropriately for example in one of the following corresponding ways.

- The MME 7 can start a timer with the duration of the validity time of the network parameters, e.g. 30 minutes. After the timer expires, the MME 7 can either delete the stored parameters or calculate the eNB-assisted parameters without taking into account the network parameters from the subscription information.
- The MME 7 can consider the network parameters from the subscription information for calculating e.g. eNB-assisted parameters only for the time period(s) when the network parameters are valid. For example between 22:00 and 23:00 hours on the 24 hour clock.

It will be appreciated that the HSS 9 may not inform validity information to the MME 7. Instead the HSS 9 may push (or activate or deactivate) the network parameters to the MME 7 each time there is a change of the network parameters in the HSS 9. The HSS can delete or can update network parameters in the MME 7 according to the validity information stored in the HSS 9.

Step 6 (S1310): The MME provides the CN assisted eNB parameters to the eNB during the setup of an S1 signalling connection (e.g., Attach, Service Request), for example, as set out in section 4.3.21.3 of TS 23.401 v 13.2.0.

Step 7 (S1312): When one of the validity timers for a CP of the UE 3 expires, then the steps 3.-6. are performed again, to ensure that the correct network parameters are available for the currently active CP or set of CPs, since the network parameters may change due to the CP to which the expired validity timer relates being removed from consideration.

Step 8 (S1314): when a new CP from another AS/SCS 13-1, 13-2 or an update to an existing CP is sent to the SCEF 11, then the steps 2.-6 are performed again, to ensure that the correct network parameters are available for the currently active CP or set of CPs, since the network parameters may change due to new or updated CP.

Timer Handling and CN Assisted eNB Parameters in SCEF

Figure 14:
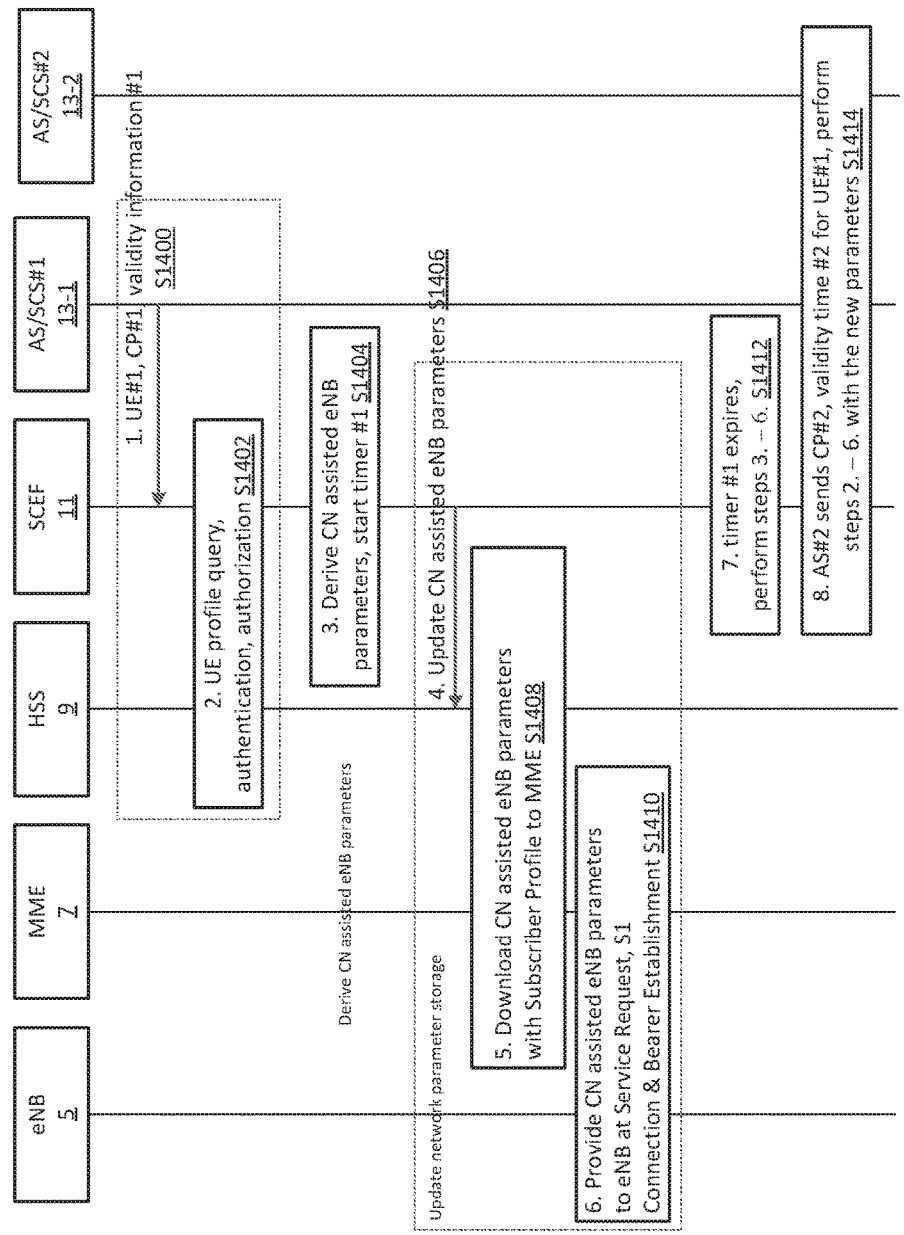

FIG. 14 describes an example in which CN-assisted parameters (e.g. as a specific example of network parameters) can be derived and their validity information handled in the SCEF 11.

Step 1 (S1400): An application server (AS)/service capability server (SCS) 13-1 of a 3rd party service provider sends a request or notification to the SCEF 11 with a set of CP parameters for a new or updated communication pattern for the UE or group of UEs communicating with the AS/SCS 13-1. The request/notification typically contains the UE ID(s), the CP and if available the corresponding validity information, and may also contain the ID of the requesting AS/SCS (e.g. AS ID).

Step 2 (S1402): The SCEF 11 may query the HSS 9 for additional information, and to perform an authentication and/or authorization procedure to authenticate/authorize the request. The HSS 9 may provide an indication of its Architecture Enhancements for Service Exposure (AESE) capability support to the SCEF 11. For example, the HSS 9 may provide a list of supported features of the HSS 9 and serving node to the SCEF 11. The SCEF 11 proceeds with the next step (step 3) only if the feature of CN assisted eNB parameter tuning is supported in HSS 9 and serving node and discards or rejects further requests in the case of no support.

Step 3 (S1404): If the CP parameter set is accompanied with validity information, then a corresponding timer is started in the SCEF 11, either at once or at a time, indicated by the validity information, when the CP is to become active. The SCEF 11 derives directly the CN assisted eNB parameters based on operator policy or configuration under consideration of all currently active CPs (i.e. CPs for which validity information is available and is not expired) for a particular UE 3. When the validity timer for a certain CP expires, the CN assisted eNB parameters are derived again to take account of the absence of the CP (e.g. a missing data traffic pattern of the CP) that does not need to be considered anymore. The SCEF 11 may retrieve a radio access technology (RAT) type for the UE 3 (for example via the HSS, MME or OAM) and determine average cell size for estimating a start value for an expected handover (HO) interval, together with mobility information (e.g. Stationary indication, Stationary location, Mobility area, Average mobility speed).

Step 4 (S1406): The SCEF 11 provides the derived network parameters (CN assisted eNB parameters) to the HSS 9, where they are stored in the subscriber profile. The message in this step may contain at least one of the following information: UE ID, SCEF ID, application (or service) ID (or information), network parameter(s) (including CN assisted eNB parameters), validity information, etc. The protocol used by the SCEF 11 may be DIAMETER but is not limited to this. In case of DIAMETER, the message may be a Profile-Update-Request message as indicated below (but could be any other DIAMETER message sent to the HSS 9):

```
< Profile-Update-Request > ::    = < Diameter Header: 307,
REQ, PXY, 16777217 >
        < Session-Id >
        { Vendor-Specific-Application-Id }
        { Auth-Session-State }
        { Origin-Host }
        { Origin-Realm }
        [ Destination-Host ]
        { Destination-Realm }
```

-continued

```
*[ Supported-Features ]
{ User-Identity }
[ Wildcarded-Public-Identity ]
[ Wildcarded-IMPU ]
[ User-Name ]
*{ Data-Reference }
{ User-Data }
[ OC-Supported-Features ]
*[ AVP ]
*[ Proxy-Info ]
*[ Route-Record ]
*[CN assisted eNB Parameters]
```

The new field/attribute value-pair (AVP) 'CN assisted eNB Parameters' in the exemplary Profile-Update-Request message will contain one or more CN assisted eNB Parameters for example values for parameters: Expected UE activity behaviour, Expected HO interval, average ECM_IDLE time, average ECM_CONNECTED time, average number of handovers etc.

If the SCm reference point is present, then it will be appreciated that the message could be sent directly to the MME 7 without traversing the HSS 9. Step 5 may be unnecessary in this case.

Step 5 (S1408): The HSS 9 stores the received CN assisted eNB parameters together with any validity information in the respective UE subscription information. The HSS 9 can update the CN assisted eNB parameters autonomously if the validity of certain CN assisted eNB parameters expires. The HSS 9 can push the updated subscription information to the MME 7, e.g. in a DIAMETER Insert Subscriber Data message, including one or more of the fields like UE ID, SCEF ID, application (or service) ID (or information), network parameter(s), validity information, CN assisted eNB parameters etc. Alternatively, the MME can download the CN assisted eNB parameters with the subscriber data in the DIAMETER Update Location Answer. The MME 7 can derive the CN assisted eNB parameters based on the network parameter(s) in the received subscription information and/or based on additional statistic information. The MME 7 can use the CN assisted eNB parameters in the received subscription information based on additional statistic information.

Step 6 (S1410): The MME provides the CN assisted eNB parameters to the eNB during the setup of an S1 signalling connection (e.g., Attach, Service Request), for example, as set out in section 4.3.21.3 of TS 23.401 v 13.2.0.

Step 7 (S1412): When one of the validity timers for a CP of the UE 3 expires, then the steps 3.-6. are performed again, to ensure that the correct network parameters are available for the currently active CP or set of CPs, since the network parameters may change due to the CP to which the expired validity timer relates being removed from consideration.

Step 8 (S1414): when a new CP from another AS/SCS 13-1, 13-2 or an update to an existing CP is sent to the SCEF 11, then the steps 2.-6 are performed again, to ensure that the correct network parameters are available for the currently active CP or set of CPs, since the network parameters may change due to new or updated CP.

Usage of a Activation/Deactivation Triggers

FIG. 15 is a flow chart illustrating, in simplified overview, a node independent call flow of the functionality that is typically executed in pursuance of the provision and use of a communication pattern (CP) with associated status information such as a status flag that acts as an Activation/Deactivation trigger to initiate activation/deactivation of a particular CP parameter set.

This example is particularly beneficial in, but is not limited to, scenarios such as that shown for UE 3-2 in FIG. 3, in which a plurality of devices (e.g. sensors) are connected via the UE 3-2 with the network, and are communicating independently with applications of different ASs 13. The communication may be at the same time or in sequence and so having the AS 13 send an activation trigger to the network in order to initiate consideration of an associated CP and a deactivation trigger when the CP should not be considered anymore is particularly useful. In this example, the CPs are stored in the network on a per UE basis, e.g. in the SCEF 11, HSS 9, the MME 7 and/or any other involved node.

It will be appreciated that in FIG. 15, the functionality of each block can be located in a different nodes e.g. SCEF, HSS, MME, eNB or any other involved node.

As seen in FIG. 15, the flow begins at S1500 when the CP is provisioned for a specific UE (represented by an associated UE ID). The CP request in this example contains an identifier of the CP (CP ID) and a Status Flag with a value indicating whether or not it is 'activated' so that the network knows whether it should consider the CP when deriving network parameters. The CP request may also contain CP parameters (e.g. for a new CP that has not previously been stored in the network). The Status Flag has two essential values "Activate" and "Deactivate" per CP per UE. If a new CP is provided for a particular UE, but the Status Flag indicates that it should be deactivated, then the network simply stores (or maintains) the associated CP parameter set in memory until the AS 13 provides a trigger, for that UE 3, to activate the CP. An update for a deactivated CP would be stored in the network without resulting in an immediate change of the derived network parameters.

At S1502 appropriate network parameters are derived taking into account any newly activated CP (e.g. a CP for which a status flag has indicated that it should be activated). If the UE 3 for which the CP has been provided already has other associated active CPs (e.g. for applications used simultaneously on the UE or being used by other entities connected via the UE) then the derivation of network parameters takes the other activated CPs for the same UE 3 into consideration.

CP parameters for each CP are stored in the network in association with a status flag, per UE, for activation/deactivation of the CP.

Once the network parameters are updated they are stored in the network, at S1504, until the next update.

The network parameters are used, at S1506, to derive the CN assisted eNB parameters.

If, at S1508, a CP gets activated or deactivated or an active CP gets updated or a new CP arrives for the same UE, then the network parameters are derived under consideration of the change in the active CPs then the network parameters are re-derived under consideration of the change in the active CPs, at S1502, and the process essentially repeats. It will be appreciated that the activation/deactivation of a CP can be independent form the provisioning of the CP at any time.

This applies also for the examples shown in following figures, which show examples when the different functionalities are located in SCEF, HSS and MME.

Status Flag Handling and NW Parameters in SCEF, CN Assisted eNB Parameters in MME.

FIG. 16 describes an example in which the handling of the status information and derivation of NW parameters takes place in the SCEF 11 while CN assisted eNB parameters (e.g. as a specific example of network parameters) are derived in the MME 7.

Step 1 (S1600): An application server (AS)/service capability server (SCS) 13-1 of a 3rd party service provider sends a request or notification to the SCEF 11 with a set of CP parameters for a new or updated communication pattern for the UE or group of UEs communicating with the AS/SCS 13-1. The request/notification typically contains the UE ID(s) the CP parameters and if available the corresponding Status Flag with, in this example, the value "Activate" indicating that the network should consider the CP (treat the CP as active).

Step 2 (S1602): The SCEF 11 may query the HSS 9 for additional information, and to perform an authentication and/or authorization procedure to authenticate/authorize the request. The HSS 9 may provide an indication of its Architecture Enhancements for Service Exposure (AESE) capability support to the SCEF 11. For example, the HSS 9 may provide a list of supported features of the HSS 9 and serving node to the SCEF 11. The SCEF 11 proceeds with the next step (step 3) only if the feature of CN assisted eNB parameter tuning is supported in the HSS 9 and the serving node and discards or rejects further requests in the case of no support.

Step 3 (S1604): The SCEF 11 derives the network parameters based on operator policy or configuration under consideration of all active CPs (i.e. Status Flag with the value "Activate") for a particular UE 3. If the CP parameter set is accompanied with a Status Flag, then the combination of UE ID, CP ID and Status Flag for the CP are stored in the SCEF 11. When the CP gets deactivated, then the network parameters are derived again to take account of the absence of the CP (e.g. a missing data traffic pattern) that does not need to be considered anymore.

Step 4 (S1606): The SCEF 11 provides the derived or mapped network parameters to the HSS 9, where they are stored by the HSS 9 in a subscriber profile. The message in this step (step 4) may contain at least one of the following information: UE ID, SCEF ID, application (or service) ID (or information), network parameter(s), status information, etc. The protocol used by the SCEF 11 may be, for example, DIAMETER but is not limited to this. In case of DIAMETER, the message may be a Profile-Update-Request message as indicated below (but could be any other DIAMETER message sent to the HSS 9):

```
< Profile-Update-Request > ::    = < Diameter Header: 307,
  REQ, PXY, 16777217 >
                < Session-Id >
                { Vendor-Specific-Application-Id }
                { Auth-Session-State }
                { Origin-Host }
                { Origin-Realm }
                [ Destination-Host ]
                { Destination-Realm }
                *[ Supported-Features ]
                { User-Identity }
                [ Wildcarded-Public-Identity ]
                [ Wildcarded-IMPU ]
                [ User-Name ]
                *{ Data-Reference }
                { User-Data }
                [ OC-Supported-Features ]
                *[ AVP ]
                *[ Proxy-Info ]
                *[ Route-Record ]
                *[Network Parameters]
```

The new field/attribute value-pair (AVP) 'Network Parameters' in the exemplary Profile-Update-Request message will typically contain one or more of the values: MBR; maximum burst data; average bitrate; expected bitrate; average activity interval; average idle interval; stationary indication; speed etc.

Step 5 (S1608): HSS 9 stores the received network parameters with status information in the respective UE subscription information. The HSS 9 can update the network parameters autonomously if the status of certain network parameters gets deactivated.

The HSS 9 can push the updated subscription information to the MME 7, (e.g. in a DIAMETER Insert Subscriber Data message, including one or more of the fields like UE ID, SCEF ID, application (or service) ID (or information), network parameter(s), status information, network parameters etc.), or alternatively the MME 7 can download the NW parameters with the subscriber data in the DIAMETER Update Location Answer.

The MME 7 can then derive the CN assisted eNB parameters based on the network parameter(s) in the received subscription information and/or based on additional statistic information.

Step 6 (S1610): The MME provides the CN assisted eNB parameters to the eNB, for example, as set out in section 4.3.21.3 of TS 23.401 v 13.2.0.

Step 7 (S1612): When one of the active CPs are deactivated (e.g. where an AS/SCS 13 sends a Trigger with the Status Flag="Deactivate"), then the steps 3.-6. are performed again to ensure that the correct network parameters are available for the currently active CP or set of CPs, since the network parameters may change due to the CP to which the 'deactivation' relates being removed from consideration.

Step 8 (S1614): When a new CP from another AS/SCS 13 or and update to an existing CP with Status Flag="Activate" is sent to the SCEF 11, then the steps 2.-6. are performed again, to ensure that the correct network parameters are available for the currently active CP or set of CPs, since the network parameters may change due to new or updated CP. Status Flag Handling and NW Parameters in HSS, CN Assisted eNB Parameters in MME FIG. 17 describes an example in which the handling of the status information and derivation of NW parameters takes place in the SCEF 11 while CN assisted eNB parameters (e.g. as a specific example of network parameters) are derived in the MME 7.

Step 1 (S1700): An application server (AS)/service capability server (SCS) 13-1 of a 3rd party service provider sends a request or notification to the SCEF 11 with a set of CP parameters for a new or updated communication pattern for the UE or group of UEs communicating with the AS/SCS 13-1. The request/notification typically contains the UE ID(s) the CP parameters and if available the corresponding Status Flag with, in this example, the value "Activate" indicating that the network should consider the CP (treat the CP as active).

Step 2 (S1702): The SCEF 11 may query the HSS 9 for additional information, and to perform an authentication and/or authorization procedure to authenticate/authorize the request. The HSS 9 may provide an indication of its Architecture Enhancements for Service Exposure (AESE) capability support to the SCEF 11. For example, the HSS 9 may provide a list of supported features of the HSS 9 and serving node to the SCEF 11. The SCEF 11 proceeds with the next step (step 3) only if the feature of CN assisted eNB parameter tuning is supported in the HSS 9 and the serving node and discards or rejects further requests in the case of no support.

Step 3 (S1706): The SCEF 11 provides the received information (e.g. UE ID, CP parameter set(s) and, if available, the corresponding Status Flag with the value "Activate") to the HSS 9. The message in this step may, for example, contain at least one of the following information: UE ID, SCEF ID (SCEF ID), application (or service) ID (or information), network parameter(s), status information, etc. The protocol used by the SCEF 11 may be DIAMETER but is not limited to this. In case of DIAMETER, the message may be a Profile-Update-Request message as indicated below (but could be any other DIAMETER message sent to the HSS 9):

```
< Profile-Update-Request > ::    = < Diameter Header: 307,
REQ, PXY, 16777217 >
            < Session-Id >
            { Vendor-Specific-Application-Id }
            { Auth-Session-State }
            { Origin-Host }
            { Origin-Realm }
            [ Destination-Host ]
            { Destination-Realm }
            *[ Supported-Features ]
            { User-Identity }
            [ Wildcarded-Public-Identity ]
            [ Wildcarded-IMPU ]
            [ User-Name ]
            *{ Data-Reference }
            { User-Data }
            [ OC-Supported-Features ]
            *[ AVP ]
            *[ Proxy-Info ]
            *[ Route-Record ]
            *[Communication Pattern]
```

The new field/attribute value-pair (AVP) 'Communication Pattern' in the exemplary Profile-Update-Request message will typically contain one or more of the CP parameter values describing the traffic and mobility behaviour as received by the SCEF 11 from the AS/SCS 13-1. Examples include periodic communication indicator, Communication duration timer, Periodic time, Scheduled communication time, Average data volume per communication, Stationary indication, Stationary location, Mobility area, Average mobility speed etc.

In addition the new field/AVP 'Communication Pattern' may contain the corresponding Status Flag with the value "Activate".

Step 4 (S1704): The HSS 9 derives the network parameter(s) based on operator policy or configuration under consideration of all active CPs (i.e. Status Flag with the value "Activate") for a particular UE 3.

If the CP parameter set received by the HSS 9 is accompanied with a Status Flag, then the combination of UE ID, CP and Status Flag for the CP are stored in the HSS 9. When the CP gets deactivated, then the network parameters may be derived again to take account of the absence of the CP (e.g. a missing data traffic pattern) that does not need to be considered anymore. The network parameters are stored in the HSS 9 in the subscriber profile.

Step 5 (S1708): The HSS 9 stores the derived network parameters, together with the associated status information, in the respective UE subscription information (e.g. subscriber profile). The HSS 9 can update the stored CP/network parameters autonomously if the status of certain network parameters gets deactivated. The HSS 9 can push the updated subscription information to the MME 7, e.g. in a DIAMETER Insert Subscriber Data message, including one or more of the fields like UE ID, SCEF ID, application (or service) ID (or information), network parameter(s), status information, network parameters etc. As an alternative to the pushing of network parameters to MME 7, the MME 7 can download the network parameters with the subscriber data in the DIAMETER Update Location Answer.

The MME 7 can then derive the CN assisted eNB parameters based on the network parameter(s) in the received subscription information and/or based on additional statistic information.

Step 6 (S1710): The MME provides the CN assisted eNB parameters to the eNB, for example, as set out in section 4.3.21.3 of TS 23.401 v 13.2.0.

Step 7 (S1712): When one of the active CPs are deactivated (e.g. where an AS/SCS 13 sends a Trigger with the Status Flag="Deactivate"), then the steps 3.-6. are performed again to ensure that the correct network parameters are available for the currently active CP or set of CPs, since the network parameters may change due to the CP to which the 'deactivation' relates being removed from consideration.

Step 8 (S1714): When a new CP from another AS/SCS 13 or and update to an existing CP with Status Flag="Activate" is sent to the SCEF 11, then the steps 2.-6. are performed again, to ensure that the correct network parameters are available for the currently active CP or set of CPs, since the network parameters may change due to new or updated CP.

Status Flag Handling and CN Assisted eNB Parameters in SCEF

FIG. 18 describes an example in which CN-assisted parameters (e.g. as a specific example of network parameters) can be derived and their status information handled in the SCEF 11.

Step 1 (S1800): An application server (AS)/service capability server (SCS) 13-1 of a 3rd party service provider sends a request or notification to the SCEF 11 with a set of CP parameters for a new or updated communication pattern for the UE or group of UEs communicating with the AS/SCS 13-1. The request/notification typically contains the UE ID(s) the CP parameters and if available the corresponding Status Flag with, in this example, the value "Activate" indicating that the network should consider the CP (treat the CP as active).

Step 2 (S1802): The SCEF 11 may query the HSS 9 for additional information, and to perform an authentication and/or authorization procedure to authenticate/authorize the request. The HSS 9 may provide an indication of its Architecture Enhancements for Service Exposure (AESE) capability support to the SCEF 11. For example, the HSS 9 may provide a list of supported features of the HSS 9 and serving node to the SCEF 11. The SCEF 11 proceeds with the next step (step 3) only if the feature of CN assisted eNB parameter tuning is supported in the HSS 9 and the serving node and discards or rejects further requests in the case of no support.

Step 3 (S1804): The SCEF 11 derives directly the CN assisted eNB parameters based on operator policy or configuration under consideration of all currently active CPs (i.e. CPs having a Status Flag with the value "Activate") for a particular UE 3. If the CP parameter set is accompanied with a status flag, then the combination of UE ID, CP and Status Flag for the CP are stored in the SCEF 11. When the CP gets deactivated, then the CN assisted eNB parameters are derived again to take account of the absence of the CP (e.g. a missing data traffic pattern of the CP) that does not need to be considered anymore. The SCEF 11 may retrieve a radio access technology (RAT) type for the UE 3 (for example via the HSS, MME or OAM) and determine average cell size for estimating a start value for an expected handover (HO) interval, together with mobility information (e.g. Stationary indication, Stationary location, Mobility area, Average mobility speed).

Step 4 (S1806): The SCEF 11 provides the derived network parameters (CN assisted eNB parameters) to the HSS 9, where they are stored in the subscriber profile. The message in this step may contain at least one of the following information: UE ID, SCEF ID, application (or service) ID (or information), network parameter(s) (including CN assisted eNB parameters), status information, etc. The protocol used by the SCEF 11 may be DIAMETER but is not limited to this. In case of DIAMETER, the message may be a Profile-Update-Request message as indicated below (but could be any other DIAMETER message sent to the HSS 9):

```
< Profile-Update-Request > ::    = < Diameter Header: 307,
REQ, PXY, 16777217 >
          < Session-Id >
          { Vendor-Specific-Application-Id }
          { Auth-Session-State }
          { Origin-Host }
          { Origin-Realm }
          [ Destination-Host ]
          { Destination-Realm }
          *[ Supported-Features ]
          { User-Identity }
          [ Wildcarded-Public-Identity ]
          [ Wildcarded-IMPU ]
          [ User-Name ]
          *{ Data-Reference }
          { User-Data }
          [ OC-Supported-Features ]
          *[ AVP ]
          *[ Proxy-Info ]
          *[ Route-Record ]
          *[CN assisted eNB Parameters]
```

The new field/attribute value-pair (AVP) 'CN assisted eNB Parameters' in the exemplary Profile-Update-Request message will contain one or more CN assisted eNB Parameters for example values for parameters: Expected UE activity behaviour, Expected HO interval, average ECM_IDLE time, average ECM_CONNECTED time, average number of handovers etc.

Step 5 (S1808): The HSS 9 stores the received CN assisted eNB parameters together with any status information in the respective UE subscription information. The HSS 9 can update the CN assisted eNB parameters autonomously if the status of certain CN assisted eNB parameters gets deactivated. The HSS 9 can push the updated subscription information to the MME 7, e.g. in a DIAMETER Insert Subscriber Data message, including one or more of the fields like UE ID, SCEF ID, application (or service) ID (or information), network parameter(s), validity information, CN assisted eNB parameters etc. Alternatively, the MME can download the CN assisted eNB parameters with the subscriber data in the DIAMETER Update Location Answer. The MME can use the CN assisted eNB parameter(s) received from the subscription based on additional statistic information. The MME 7 can use the CN assisted eNB parameters in the received subscription information based on additional statistic information.

Step 6 (S1810): The MME provides the CN assisted eNB parameters to the eNB, for example, as set out in section 4.3.21.3 of TS 23.401 v 13.2.0.

Step 7 (S1812): When one of the active CPs are deactivated (here AS sends a Trigger with the Status Flag="Deactivate"), then the steps 3.-6. are performed again, to ensure that the correct network parameters are available for the currently active CP or set of CPs, since the network parameters may change due to the CP to which the expired validity timer relates being removed from consideration.

Step 8 (S1414): when a new CP from another AS/SCS 13-1, 13-2 or an update to an existing CP is sent to the SCEF 11, then the steps 2.-6 are performed again, to ensure that the correct network parameters are available for the currently active CP or set of CPs, since the network parameters may change due to the CP to which the 'deactivation' relates being removed from consideration.

Step 8 (S1714): When a new CP from another AS/SCS 13 or and update to an existing CP with Status Flag="Activate" is sent to the SCEF 11, then the steps 2.-6. are performed again, to ensure that the correct network parameters are available for the currently active CP or set of CPs, since the network parameters may change due to new or updated CP.

Benefits, Modifications and Alternatives

Detailed embodiments have been described above. As those skilled in the art will appreciate, a number of benefits arise from features of these embodiments, and a number of modifications and alternatives can be made to the above embodiments whilst still benefiting from the inventions embodied therein. By way of illustration only a number of these benefits, alternatives and modifications will now be described.

It will be appreciated that, as a prerequisite of the above exemplary processes, the MME 7 and the HSS 9 may indicate their capability of support to the SCEF 11. This may be done, for example, either in any DIAMETER Update-Location-Request (ULR) Command from the serving node (e.g. MME, SGSN etc.) to the HSS 9 or in any other DIAMETER message to the HSS 9, or any other protocol like XML, RADIUS etc. When the HSS 9 also supports the feature, i.e. serving node and HSS support the specific AESE feature, then this capability may be provided to the SCEF 11 in a later request. If the request from the SCEF 11 is on a per UE basis and also concerning the serving node of the UE 3 then the HSS 9 may only provide the combined/matched capability information or may provide the capability information separately. The capability match procedure may apply in step 2 of the call flows illustrated in FIGS. 12 to 14 and 16 to 18. In case the request from the SCEF 11 arrives before the serving node has provided any capability information, then only the HSS 9 capability is provided or, e.g. based on operator policy or configuration, the HSS 9 sets the matched capability to unsupported until it has learned about the capability of the serving node, or the HSS 9 queries the last serving node (if known) for the capability support.

It can be seen that the above examples include a number of particularly beneficial features that may be incorporated into embodiments in combination, or separately where applicable, including: accumulating active CPs per UE and deriving network parameters and/or CN assisted eNB parameters for the sum of active CPs; provisioning of a validity time and/or activation/deactivation trigger per CP per UE; a new field/AVP in a DIAMETER Profile-Update-Request message (e.g. to provide CP parameters, network parameters, or CN assisted eNB Parameters) from the SCEF to the HSS; creating a binding of CP, UE ID, validity time or status flag in the SCEF, HSS or any other involved node; storing of the binding in any of the involved nodes (albeit preferably in SCEF and or HSS); updating of the network parameters and/or CN assisted eNB parameters when there is a change in the set of active CPs per UE; and AESE feature capability indication from the serving node and HSS in a combined way or separate way.

A particularly advantageous feature would be provision of a capability indication for the support of dynamic change of network parameters for single or multiple applications with individual validity time/interval for each application.

As described herein, the home subscriber server may comprise a transmitter configured to provide, to a mobility management entity, 'MME', at least one set of parameters associated with the communication pattern together with an associated validity time. The transmitter may provide the at least one set of parameters associated with the communication pattern in subscription protocol information. The at least one communication pattern parameter set received, together with an associated validity time, from the SCEF, may be received together with an SCEF Reference ID.

As described herein, in the mobility management entity the controller may be configured to use the at least one set of parameters associated with a communication pattern received from the HSS as an input for deriving values for core network assisted evolved nodeB, 'CN assisted eNB', parameters.

As described herein, in the service capability exposure function according the at least one communication pattern parameter set received, together with an associated validity time, from the SCS/AS, may be received together with an identifier of the SCS/AS.

It will be appreciated that the radio access technology is not limited to E-UTRA, and may comprise any suitable access technology in accordance with one or more of the following standards: LTE, UMTS, GPRS, WiFi, WiMAX, and/or the like.

It will be appreciated that the above description may be applicable to 3GPP mobile networks, using GSM, GPRS, UMTS, HSPA, LTE, LTE-A access, and/or the like. However, the above description is not limited to such networks and could be used in the same way for any other cellular or mobile network, e.g. CDM2000, Bluetooth, 802.11 variants, ZigBee etc., i.e. any access technologies and core network technologies, to which a CS capable mobile device (UE) can connect.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop/tablet computers, booklet computers, wireless routers, web browsers, e-book readers, etc. As those skilled in the art will appreciate, it is not essential that the above described system be used for mobile communications devices. The system can be used to improve a network having one or more fixed communication devices as well as or instead of the mobile communicating devices.

In the above embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above embodiments employed transceiver circuitry, at least some of the functionality of the transceiver circuitry can be performed by software.

As indicated above in one example there is provided a home subscriber server, 'HSS', for a communication network, the HSS comprising: a receiver configured to receive, from a service capability exposure function, 'SCEF', at least one communication pattern parameter set together with an associated validity time; and a controller configured: to store the at least one communication pattern parameter set; and when the validity time for a communication pattern parameter set stored in the HSS expires, to autonomously delete the associated communication pattern parameter set. In this example, the home subscriber server may further comprise a transmitter configured to provide, to a mobility management entity, 'MME', at least one set of parameters associated with the communication pattern together with an associated validity time. The transmitter may provide the at least one set of parameters associated with the communication pattern in subscription protocol information. The at least one communication pattern parameter set received, together with an associated validity time, from the SCEF, may be received together with an SCEF Reference ID.

As indicated above in one example there is provided a mobility management entity, 'MME' for a communication network, the MME comprising: a receiver configured to receive, from home subscriber server, 'HSS', at least one set of parameters associated with a communication pattern together with an associated validity time; and a controller configured to: store the received parameter set for the associated communication pattern; and when the validity time for the parameter set stored in the MME expires, to autonomously delete that parameter set. In this example, the controller may be further configured to use the at least one set of parameters associated with a communication pattern received from the HSS as an input for deriving values for core network assisted evolved nodeB, 'CN assisted eNB', parameters.

As indicated above in one example there is provided a service capability exposure function, 'SCEF', for a communication network, the SCEF comprising: a receiver configured to receive, from a service capability server/application server, 'SCS/AS', at least one communication pattern, 'CP', parameter set together with an associated validity time; and a transmitter configured to transmit to a home subscriber server, 'HSS', the at least one CP parameter and associated validity time. In this example, the at least one communication pattern parameter set received, together with an associated validity time, from the SCS/AS, may be received together with an identifier of the SCS/AS. The SCEF may also comprise a controller configured, upon reception of an update for the stored CP parameter set from the SCS/AS, to at least one of: derive an updated CP parameter set (and/or a validity time for an updated CP parameter set); and add, modify or delete a stored CP parameter set (and/or a validity time for the stored CP parameter set to which the update relates); wherein the transmitter may be configured to transmit any resulting updated/added/modified CP parameter set (and/or validity time) to the HSS.

Various other modifications will be apparent to those skilled in the art and will not be described in further detail here.

LIST OF ABBREVIATIONS

AESE Architecture Enhancements for Service Exposure
SCEF Service Capability Exposure Function
CP Communication Pattern
MME Mobility Management Entity
HO Handover AS Application Server
UE User Equipment
API Application Programming Interface
eNB Evolved NodeB
HSS Home Subscriber Server
SCS Service Capability Server
NW Network
AVP Attribute Value Pair

The invention claimed is:

1. A home subscriber server (HSS) for a communication network, the HSS comprising:
    a receiver circuit configured to receive, from a service capability exposure function (SCEF) at least one communication pattern parameter set together with an associated validity time that indicates when the communication pattern parameter set expires; and
    a processor configured:
        to store the at least one communication pattern parameter set; and
        when the validity time for a communication pattern parameter set stored in the HSS expires, to autonomously delete the associated communication pattern parameter set.

2. The home subscriber server of claim 1 further comprising a transmitter circuit configured to provide, to a mobility management entity (MME) at least one set of parameters associated with the communication pattern together with an associated validity time.

3. The home subscriber server of claim 2 wherein the transmitter provides the at least one set of parameters associated with the communication pattern in subscription protocol information.

4. The home subscriber server of claim 1 wherein the at least one communication pattern parameter set received, together with an associated validity time, from the SCEF, is received together with an SCEF Reference ID.

5. A mobility management entity (MME) for a communication network, the MME comprising:
    a receiver circuit configured to receive, from a home subscriber server (HSS) at least one set of parameters associated with a communication pattern together with an associated validity time that indicates when the communication pattern parameter set expires; and
    a processor configured to:
        store the received parameter set for the associated communication pattern; and
        when the validity time for the parameter set stored in the MME expires, to autonomously delete that parameter set.

6. The mobility management entity of claim 5 wherein the processor is further configured to use the at least one set of parameters associated with a communication pattern received from the HSS as an input for deriving values for a core network assisted evolved nodeB (CN assisted eNB) parameters.

7. A service capability exposure function (SCEF) for a communication network, the SCEF comprising:
    a receiver circuit configured to receive, from a service capability server/application server (SCS/AS) at least one communication pattern (CP) parameter set together with an associated validity time that indicates when the CP parameter set expires; and
    a transmitter circuit configured to transmit, to a home subscriber server (HSS) the at least one CP parameter and associated validity time.

8. A service capability exposure function according to claim 7 wherein the at least one communication pattern parameter set received, together with an associated validity time, from the SCS/AS, is received together with an identifier of the SCS/AS.

9. A service capability exposure function according to claim 7 wherein the SCEF comprises a processor configured, upon reception of an update for the stored CP parameter set from the SC S/AS, to at least one of:
    derive at least one of an updated CP parameter set and a validity time for an updated CP parameter set; and
    add, modify or delete at least one of stored CP parameter set and a validity time for the stored CP parameter set to which the update relates; and
    wherein the transmitter circuit is configured to transmit at least one of any resulting updated/added/modified CP parameter set and validity time to the HSS.

10. A service capability server/application server (SCS/AS) for a communication network, the SCS/AS comprising:
    a controller configured to control the SCS/AS to:
    provide, to a service capability exposure function (SCEF) at least one communication pattern (CP) parameter set together with an associated validity time that indicates when the CP parameter set expires.

11. A method performed by a home subscriber server (HSS) of a communication network, the method comprising:
    receiving, from a service capability exposure function (SCEF) at least one communication pattern parameter set together with an associated validity time that indicates when the communication pattern parameter set expires;
    storing the at least one communication pattern parameter set; and
    when the validity time for a communication pattern parameter set stored in the HSS expires, autonomously deleting the associated communication pattern parameter set.

12. A method performed by a mobility management entity (MME) of a communication network, the method comprising:
    receiving, from a home subscriber server (HSS) at least one set of parameters associated with a communication pattern together with an associated validity time that indicates when the communication pattern parameter set expires;
    storing the received parameter set for the associated communication pattern; and
    when the validity time for the parameter set stored in the MME expires, autonomously deleting that parameter set.

13. A method performed by a service capability exposure function (SCEF) of a communication network, the method comprising:
    receiving, from an service capability server/application server (SCS/AS) at least one communication pattern (CP) parameter set together with an associated validity time that indicates when the CP parameter set expires; and
    transmitting, to a home subscriber server (HSS) the at least one CP parameter and associated validity time.

14. A method performed by a service capability server/application server (SCS/AS) of a communication network, the method comprising:
    providing, to a service capability exposure function (SCEF) at least one communication pattern (CP) parameter set together with an associated validity time that indicates when the CP parameter set expires.

* * * * *